(12) United States Patent
Yamakawa et al.

(10) Patent No.: US 11,067,135 B2
(45) Date of Patent: *Jul. 20, 2021

(54) AUTOMATIC TRANSMISSION

(71) Applicant: Mazda Motor Corporation, Hiroshima (JP)

(72) Inventors: Shota Yamakawa, Hiroshima (JP); Tatsuhiko Iwasaki, Hiroshima (JP); Tomotaka Ishizaka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,449

(22) Filed: Jan. 22, 2019

(65) Prior Publication Data

US 2019/0257370 A1 Aug. 22, 2019

(30) Foreign Application Priority Data

Feb. 20, 2018 (JP) .............................. JP2018-028070

(51) Int. Cl.
| F16D 25/0638 | (2006.01) |
| F16D 48/02 | (2006.01) |
| F16H 3/62 | (2006.01) |
| F16H 63/30 | (2006.01) |
| F16H 57/10 | (2006.01) |

(Continued)

(52) U.S. Cl.
CPC ......... *F16D 25/0638* (2013.01); *F16D 25/14* (2013.01); *F16H 3/62* (2013.01); *F16H 57/10* (2013.01); *F16H 63/3026* (2013.01); *F16D 2121/04* (2013.01); *F16D 2125/06* (2013.01); *F16H 3/663* (2013.01); *F16H 57/0473* (2013.01); *F16H 57/0484* (2013.01); *F16H 2063/303* (2013.01); *F16H 2200/006* (2013.01); *F16H 2200/2012* (2013.01); *F16H 2200/2043* (2013.01)

(58) Field of Classification Search
CPC .. F16D 25/0638; F16D 2121/04; F16D 13/72; F16D 2063/303

See application file for complete search history.

(56) References Cited

U.S. PATENT DOCUMENTS 4,346,796 A 8/1982 Ueno
4,540,077 A * 9/1985 Yamamoto .............. F16D 13/72
192/70.12

(Continued)

FOREIGN PATENT DOCUMENTS

JP 2006312956 A 11/2006
JP 2017150533 A 8/2017

(Continued)

*Primary Examiner* — Ernesto A Suarez
*Assistant Examiner* — Lillian T Nguyen
(74) *Attorney, Agent, or Firm* — Alleman Hall Creaseman & Tuttle LLP

(57) ABSTRACT

An automatic transmission is provided, which includes a friction engaging element. The friction engaging element includes a plurality of friction plates disposed inside a transmission case, a piston configured to cause the plurality of friction plates to be engaged with each other, a spring configured to bias the piston, and a hydraulic chamber to which hydraulic fluid is supplied, the hydraulic fluid biasing the piston. The hydraulic chamber is disposed so as to overlap with the spring in a radially internal and external relationship.

10 Claims, 17 Drawing Sheets

(51) Int. Cl.
  *F16D 121/04* (2012.01)
  *F16D 125/06* (2012.01)
  *F16H 57/04* (2010.01)
  *F16H 3/66* (2006.01)

(56) References Cited

U.S. PATENT DOCUMENTS

| | | | | |
|---|---|---|---|---|
| 5,950,787 A * | 9/1999 | Murasugi | ................ | F16D 25/06 |
| | | | | 192/85.25 |
| 8,636,126 B2 * | 1/2014 | Fukaya | ................... | F16D 21/06 |
| | | | | 192/48.611 |
| 10,247,305 B2 | 4/2019 | Sasahara et al. | | |
| 2005/0284724 A1 * | 12/2005 | Hagenow | ............ | F16D 25/0638 |
| | | | | 192/85.41 |
| 2013/0186714 A1 * | 7/2013 | Hoots | ..................... | F16D 65/12 |
| | | | | 188/71.5 |
| 2013/0186715 A1 * | 7/2013 | Monroe | ................. | F16D 65/12 |
| | | | | 188/71.5 |
| 2015/0240887 A1 | 8/2015 | Kramm et al. | | |
| 2016/0047426 A1 * | 2/2016 | Azumai | .................. | F16D 21/06 |
| | | | | 192/48.601 |
| 2016/0281807 A1 * | 9/2016 | Kaufman | ............... | F16D 65/853 |
| 2017/0241487 A1 * | 8/2017 | Sasahara | ............ | F16D 25/0638 |
| 2017/0241546 A1 | 8/2017 | Sasahara et al. | | |
| 2017/0335909 A1 | 11/2017 | Dennis et al. | | |
| 2019/0257370 A1 | 8/2019 | Yamakawa et al. | | |
| 2019/0257371 A1 * | 8/2019 | Yamakawa | ............. | F16D 55/40 |
| 2019/0257376 A1 | 8/2019 | Yamakawa et al. | | |
| 2019/0283719 A1 | 9/2019 | Yamakawa et al. | | |
| 2019/0285167 A1 | 9/2019 | Yamakawa et al. | | |
| 2019/0285174 A1 | 9/2019 | Yamakawa et al. | | |

FOREIGN PATENT DOCUMENTS

| | | |
|---|---|---|
| WO | 2009054189 A1 | 4/2009 |
| WO | 2013171986 A1 | 11/2013 |

* cited by examiner

|  | CL1 | CL2 | CL3 | BR1 | BR2 |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

AUTOMATIC TRANSMISSION

TECHNICAL FIELD

The present disclosure relates to an automatic transmission mounted on a vehicle, and belongs to a technical field of the automatic transmission for vehicles.

BACKGROUND OF THE DISCLOSURE

An automatic transmission mounted on a vehicle is provided with a plurality of planetary gear sets (planetary gear mechanisms), and a plurality of friction engaging elements, such as a clutch and a brake. The automatic transmission is constructed so that a plurality of friction engaging elements are selectively engaged with a hydraulic control to switch between power transmission paths via respective planetary gear sets, thereby achieving a plurality of forward gear ratios and normally one reverse gear ratio.

In recent years, a torque converter tends to be eliminated from the automatic transmission because the transmission is demanded, for example, to have more selectable gear ratios, and to reduce the weight. Without the torque converter, the vehicle can smoothly start traveling without an engine stall by carrying out a slip control of at least one friction engaging element which is engaged at a first gear.

If carrying out the slip control of the friction engaging element which is engaged at the first gear when the vehicle starts traveling, since the brake of which a hydraulic chamber does not rotate is better in controllability when engaged, than the clutch of which a hydraulic chamber rotates, the slip control of the brake may be carried out.

Among the brakes constructed in this way, it is known that a piston which causes a friction plate to be engaged is biased and moved in the engaging direction by a spring in order to improve the response when the vehicle starts traveling.

For example, JP2017-150533A discloses a brake in which a piston which causes a plurality of friction plates to be engaged is biased by a first spring and a second spring in the engaging direction from the released position to a first position a given distance from the released position, is biased only by the second spring from the first position to a second position where the plurality of friction plates become in a zero clearance state, and is biased by the hydraulic pressure for engagement from the second position to an engaged position to cause the plurality of friction plates to be engaged.

FIG. 17 illustrates a cross-sectional view of such a brake 200 in the automatic transmission. The brake 200 includes a plurality of friction plates 203 disposed between an inner stationary member 201 coupled to a transmission case and an outer rotary member 202 coupled to a given rotary member, and a piston 206 fitted into a cylinder 205 which is formed by an outer cylindrical part 204a, a flange part 204b, and an inner cylindrical part 204c of a housing 204 which are parts of the transmission case.

The brake 200 also includes a hydraulic chamber 207 for engagement to which hydraulic fluid for engagement which biases the piston 206 in the engaging direction is supplied, and a hydraulic chamber 208 for release which is disposed at the opposite side of the hydraulic chamber 207 with the piston 206 therebetween, and to which hydraulic fluid for release which biases the piston 206 in the releasing direction is supplied.

In the hydraulic chamber 207 for engagement, a first spring 209 and a second spring 210 which bias the piston 206 in the engaging direction are disposed. The second spring 210 is disposed inside a groove portion 204d formed in the outer cylindrical part 204a of the housing 204, and the first spring 209 is disposed radially inward of the second spring 210.

When engaging the brake 200, if the hydraulic pressure for release is released from a state in which the hydraulic pressure for engagement is released from the hydraulic chamber 207 for engagement, and hydraulic pressure for release is supplied to the hydraulic chamber 208 for release to move the piston 206 to the released position where the first spring 209 and the second spring 210 are compressed, the piston 206 is biased by the first spring 209 and the second spring 210 to be moved to the first position where is the given distance away from the released position in the engaging direction.

When the piston 206 reaches the first position, the piston 206 is then biased only by the first spring 209 to be moved from the first position to the second position where the plurality of friction plates 203 become in the zero clearance state. After the piston 206 reaches the second position, when the hydraulic pressure for engagement is supplied, the piston 206 is then biased by the hydraulic pressure for engagement to be moved to the engaged position where the plurality of friction plates 203 are engaged.

On the other hand, when releasing the brake 200, if the hydraulic pressure for engagement is released and the hydraulic pressure for release is supplied, from a state in which the hydraulic pressure for release is released from the hydraulic chamber 208 for release, and the hydraulic pressure for engagement is supplied to the hydraulic chamber 207 for engagement to move the piston 206 to the engaged position, the piston 206 is biased in the releasing direction and the piston 206 is moved to the released position where the first spring 209 and the second spring 210 are compressed.

In the brake 200, since the biasing force of the second spring 210 is set larger than the biasing force of the first spring 209, the piston 206 can be moved with sufficient response by the first spring 209 and the second spring 210 from the released position to the first position, and can then be moved with sufficient accuracy by the first spring 209 from the first position to the second position.

However, the automatic transmission provided with the brake disclosed in JP2017-150533A has a structure with a large axial dimension in which the biasing member which biases in the engaging direction the piston which causes the plurality of friction plates to be engaged, and the hydraulic chamber for release to which the hydraulic fluid for release which biases by the biasing member the piston in the releasing direction which is opposite from the biasing direction is supplied, are disposed serially in the axial directions.

Therefore, in such an automatic transmission, shortening the axial dimension to downsize the automatic transmission is desired while securing the disposed space of the biasing member, when the transmission is structured to have the biasing member which biases the piston, and the hydraulic chamber to which the hydraulic fluid which biases the piston in the opposite direction from the biasing direction by the biasing member is supplied.

Regarding an automatic transmission provided with a friction engaging element having a hydraulic chamber for engagement to which hydraulic fluid for engagement which biases in the engaging direction a piston which causes a plurality of friction plates to be engaged is supplied, and a return spring as a biasing member which biases the piston in the releasing direction, this kind of transmission is also desired to be downsized, because it has a structure with a large axial dimension, if the biasing member and the hydraulic chamber are serially disposed in the axial directions.

SUMMARY OF THE DISCLOSURE

Therefore, one purpose of the present disclosure is to provide an automatic transmission provided with a friction engaging element having a biasing member (spring) which biases a piston, and a hydraulic chamber to which hydraulic fluid which biases the piston is supplied, which can be axially downsized, while securing a disposed space of the biasing member.

According to one aspect of the present disclosure, an automatic transmission is provided which includes a friction engaging element. The friction engaging element includes a plurality of friction plates disposed inside a transmission case, a piston configured to cause the plurality of friction plates to be engaged with each other, a spring configured to bias the piston, and a hydraulic chamber to which hydraulic fluid is supplied, the hydraulic fluid biasing the piston. The hydraulic chamber is disposed so as to overlap with the spring in a radially internal and external relationship.

According to this configuration, compared to a case where the hydraulic chamber is not in a radially internal and external relationship with the spring, the automatic transmission as described above can be shortened in axial dimensions and thereby it can be axially downsized, while securing the disposed space of the spring.

Further, the spring may bias the piston in an engaging direction to cause the plurality of friction plates to be engaged with each other.

According to this configuration, with the spring as described above, the above described effect can also be exerted.

Further, the hydraulic chamber may include a hydraulic chamber for engagement to which hydraulic fluid to bias the piston in the engaging direction is supplied, and a hydraulic chamber for release disposed at an opposite side of the piston from the hydraulic chamber for engagement, the hydraulic chamber for release being supplied with hydraulic fluid to bias the piston in a releasing direction opposite from the engaging direction. The hydraulic chamber for engagement and the hydraulic chamber for release may each be disposed so as to overlap with the spring in the radially internal and external relationship.

According to this configuration, compared to the case where the hydraulic chamber is not in a radially internal and external relationship with the spring, the automatic transmission can be axially downsized.

Further, the hydraulic chamber for release may be formed to have an outer diameter smaller than the hydraulic chamber for engagement. A biasing force receiving member configured to receive the biasing force of the spring may be coupled to the piston and disposed at an outer circumferential side of the hydraulic chamber for release.

According to this configuration, the biasing force receiving member can be coupled to the piston at the outer circumferential side of the hydraulic chamber for release of which the outer diameter is formed smaller than the hydraulic chamber for engagement, thereby effectively utilizing the space at the outer circumferential side of the hydraulic chamber for release.

Further, the spring may include a first spring and a second spring with a longer free length than the first spring, the first spring configured to exert a larger biasing force than the second spring.

According to this configuration, the piston can be moved with sufficient response from a released position to an immediately-before-contact position by the first spring with the larger biasing force than the second spring, in addition to the second spring, and the piston can be moved with sufficient accuracy from the immediately-before-contact position to the zero clearance position by the second spring, and thereby the piston can be moved with sufficient response and with sufficient accuracy to the zero clearance position.

Since the piston can be moved with sufficient accuracy to the zero clearance position, a shock caused by the piston being located on the engagement side of the zero clearance position to press the friction plates, and a slowing of the response caused by the piston being located on the releasing side of the zero clearance position, can be prevented.

According to another aspect of the present disclosure, an automatic transmission is provided which includes a friction engaging element. The friction engaging element includes a plurality of friction plates disposed inside a transmission case, a piston configured to cause the plurality of friction plates to be engaged with each other, a spring configured to bias the piston in an engaging direction to cause the plurality of friction plates to be engaged with each other, and a hydraulic chamber to which hydraulic fluid is supplied, the hydraulic fluid biasing the piston. The hydraulic chamber is disposed so as to overlap with the spring in a radially internal and external relationship.

According to still another aspect of the present disclosure, an automatic transmission is provided which includes a friction engaging element. The friction engaging element includes a plurality of friction plates disposed inside a transmission case, a piston configured to cause the plurality of friction plates to be engaged with each other, a spring configured to bias the piston, and a hydraulic chamber to which hydraulic fluid is supplied, the hydraulic fluid biasing the piston. The spring is disposed between the hydraulic chamber and the transmission case.

BRIEF DESCRIPTION OF DRAWINGS

FIG. 2 is an engagement table of friction engaging elements of the automatic transmission.

DETAILED DESCRIPTION OF THE DISCLOSURE

Hereinafter, one embodiment of the present disclosure is described with reference to the accompanying drawings.

Figure 1:
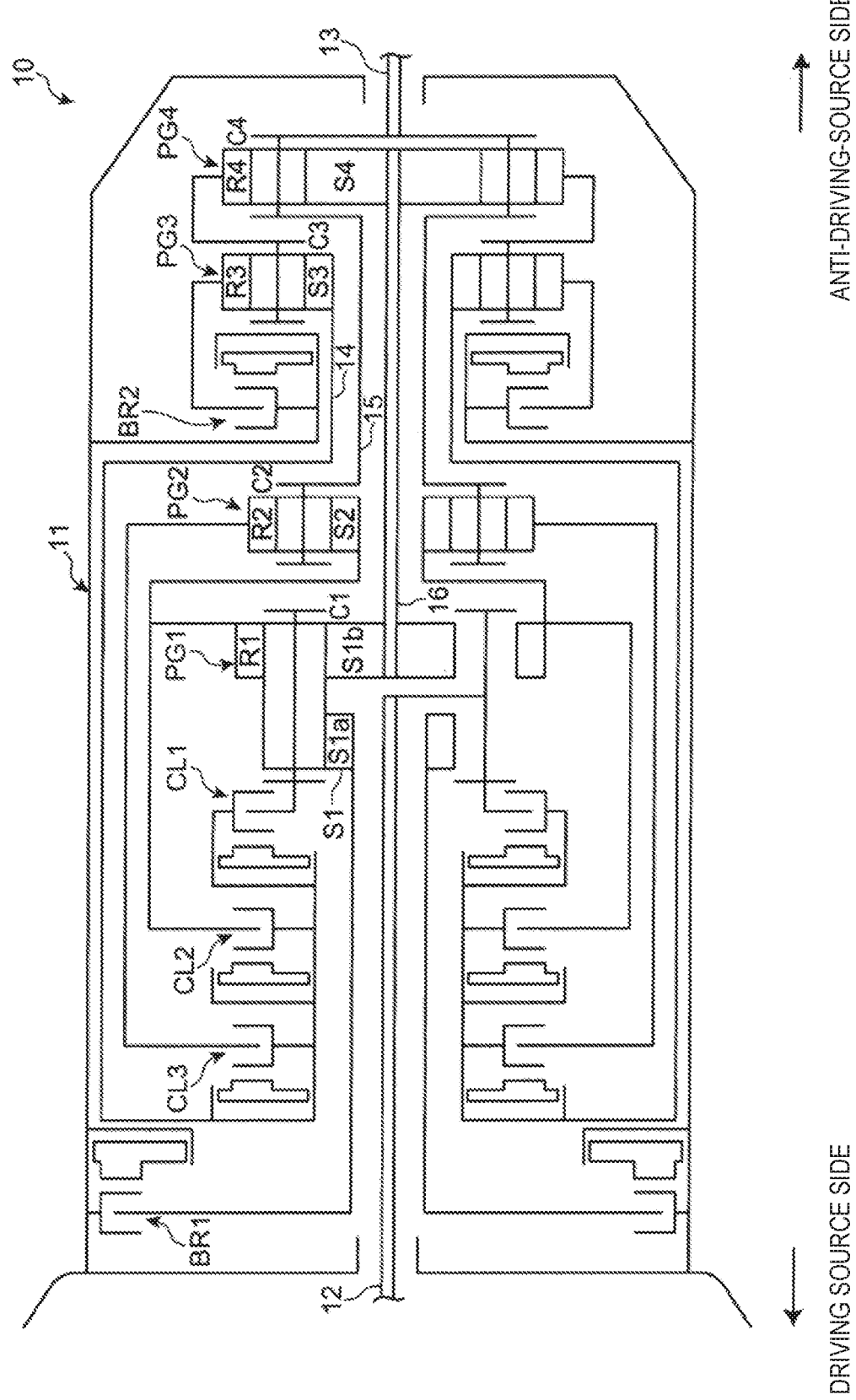
FIG. 1 is a view schematically illustrating an automatic transmission according to one embodiment of the present disclosure.

FIG. 1 is a view schematically illustrating an automatic transmission according to one embodiment of the present disclosure. An automatic transmission 10 has, in a transmission case 11, an input shaft 12 coupled to a driving source and disposed at the driving source side (left side in this figure), and an output shaft 13 disposed at the opposite side of the driving source side (anti-driving-source side, or right side in this figure). The automatic transmission 10 is of a longitudinal type for a front-engine rear-drive (FR) vehicle in which the input shaft 12 and the output shaft 13 are disposed coaxially.

On the axial center of the input shaft 12 and the output shaft 13, first, second, third, and fourth planetary gear sets (hereinafter, simply referred to as "the first, second, third, and fourth gear sets") PG1, PG2, PG3, and PG4 are disposed in this order from the driving source side.

In the transmission case 11, a first clutch CL1 is disposed at the driving source side of the first gear set PG1, a second clutch CL2 is disposed at the driving source side of the first clutch CL1, and a third clutch CL3 is disposed at the driving source side of the second clutch CL2. Moreover, a first brake BR1 is disposed at the driving source side of the third clutch CL3, and a second brake BR2 is disposed at the driving source side of the third gear set PG3 and at the anti-driving-source side of the second gear set PG2.

Each of the first, second, third, and fourth gear sets PG1, PG2, PG3, and PG4 is of a single pinion type in which a pinion supported by a carrier directly meshes with sun gears and a ring gear. The first, second, third, and fourth gear sets PG1, PG2, PG3, and PG4 have sun gears S1, S2, S3, and S4, ring gears R1, R2, R3, and R4, and carriers C1, C2, C3, and C4, as rotary members, respectively.

The first gear set PG1 is of a double sun gear type in which the sun gear S1 is divided into two in the axial directions. The sun gear S1 has a first sun gear S1a disposed at the driving source side, and a second sun gear S1b disposed on the anti-driving-source side. The first and the second sun gears S1a and S1b have the same number of teeth, and mesh with the same pinion supported by the carrier C1. Thus, the first and the second sun gears S1a and S1b always rotate together.

In this automatic transmission 10, the sun gear S1 of the first gear set PG1 (specifically, the second sun gear S1b) is always coupled to the sun gear S4 of the fourth gear set PG4, the ring gear R1 of the first gear set PG1 is always coupled to the sun gear S2 of the second gear set PG2, the carrier C2 of the second gear set PG2 is always coupled to the carrier C4 of the fourth gear set PG4, and the carrier C3 of the third gear set PG3 is always coupled to the ring gear R4 of the fourth gear set PG4.

The input shaft 12 is always coupled to the carrier C1 of the first gear set PG1 is the first sun gear S1a and the second sun gear S1b, and the output shaft 13 is always coupled to the carrier C4 of the fourth gear set PG4.

The first clutch CL1 is disposed between the input shaft 12 and the carrier C1 of the first gear set PG1, and the sun gear S3 of the third gear set PG3, and connects and disconnects these gear sets. The second clutch CL2 is disposed between the ring gear R1 of the first gear set PG1 and the sun gear S2 of the second gear set PG2, and the sun gear S3 of the third gear set PG3, and connects and disconnects these gear sets. The third clutch CL3 is disposed between the ring gear R2 of the second gear set PG2 and the sun gear S3 of the third gear set PG3, and connects and disconnects these gear sets.

The first brake BR1 is disposed between the transmission case 11 and the sun gear S1 of the first gear set PG1 (specifically, the first sun gear S1a), and connects and disconnects these gears. The second brake BR2 is disposed between the transmission case 11 and the ring gear R3 of the third gear set PG3, and connects and disconnects these gears.

With the above structure, the automatic transmission 10 selectively combines the engaged states of the first clutch CL1, the second clutch CL2, the third clutch CL3, the first brake BR1, and the second brake BR2 to form first to eighth gears for a D-range (forward driving range) and a reverse gear for an R-range, as illustrated in FIG. 2.

In this automatic transmission 10, a slip control is carried out for the second brake BR2 which engages at the first gear when the vehicle starts traveling, and thereby the second brake BR2 corresponds to a friction engaging element of the automatic transmission according to the present disclosure. Below, this brake BR2 is described.

Figure 3:
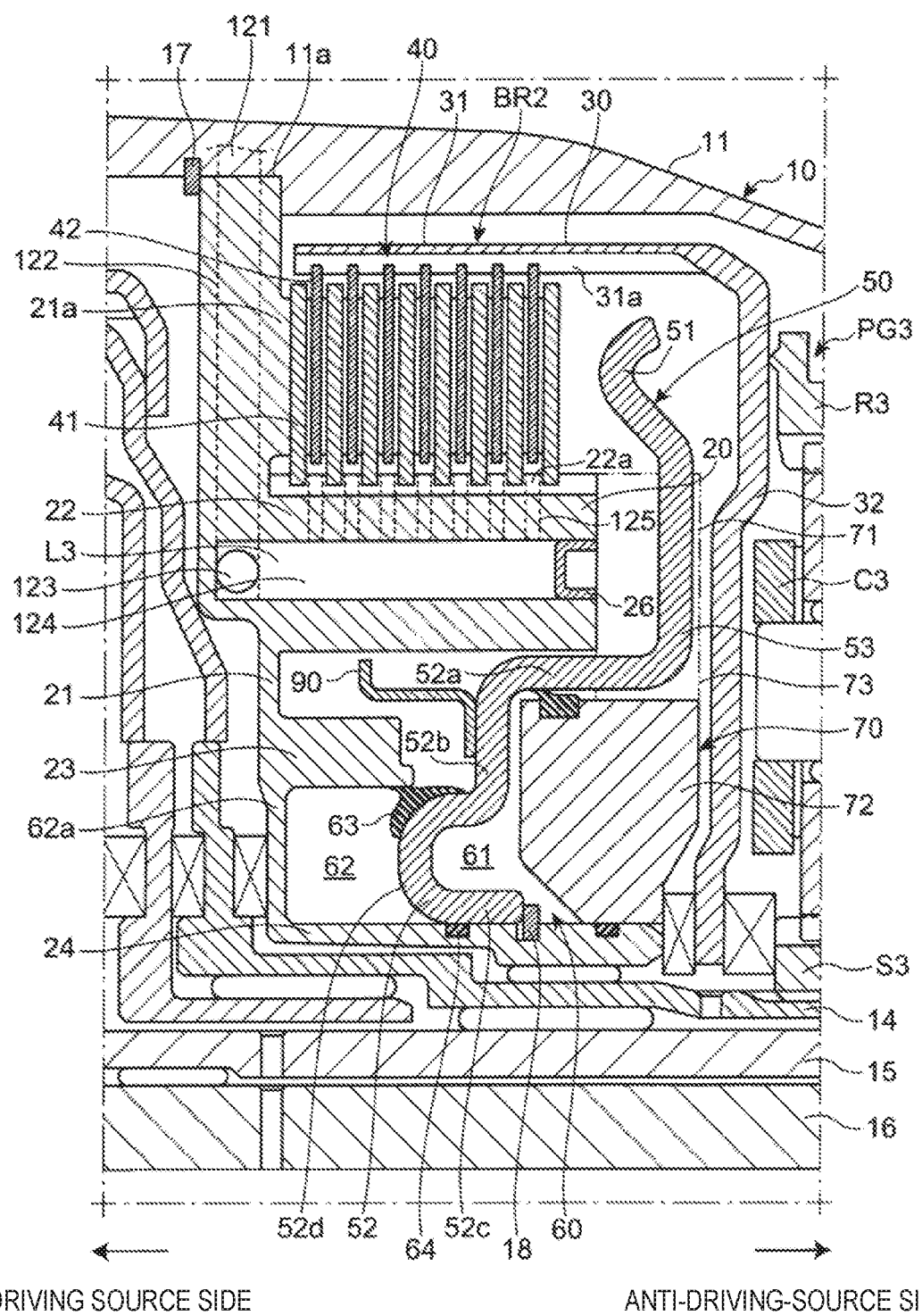
FIG. 3 is a cross-sectional view illustrating a brake of the automatic transmission, and its periphery.
Figure 4:
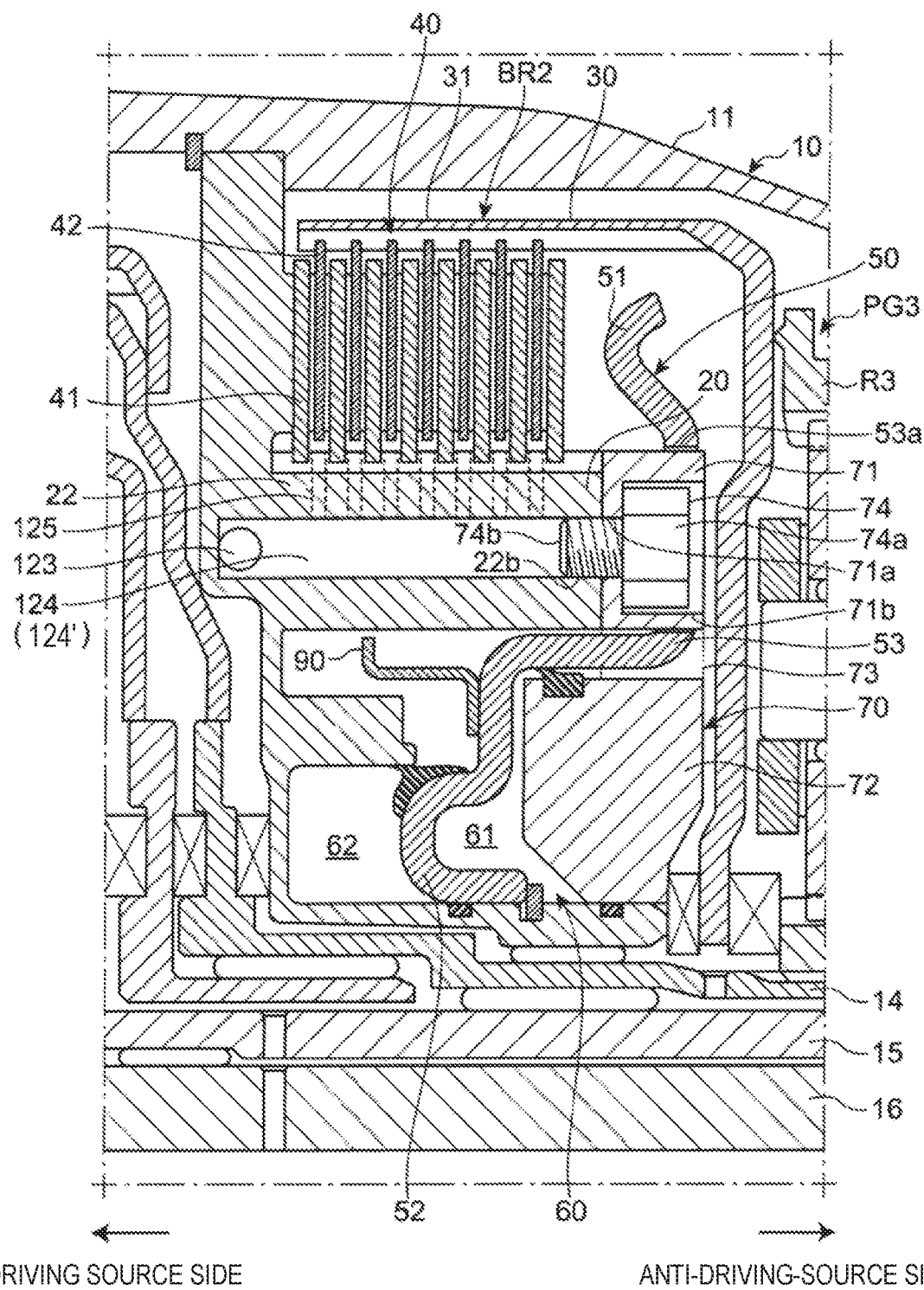
FIG. 4 is another cross-sectional view illustrating the brake and its periphery.
Figure 5:
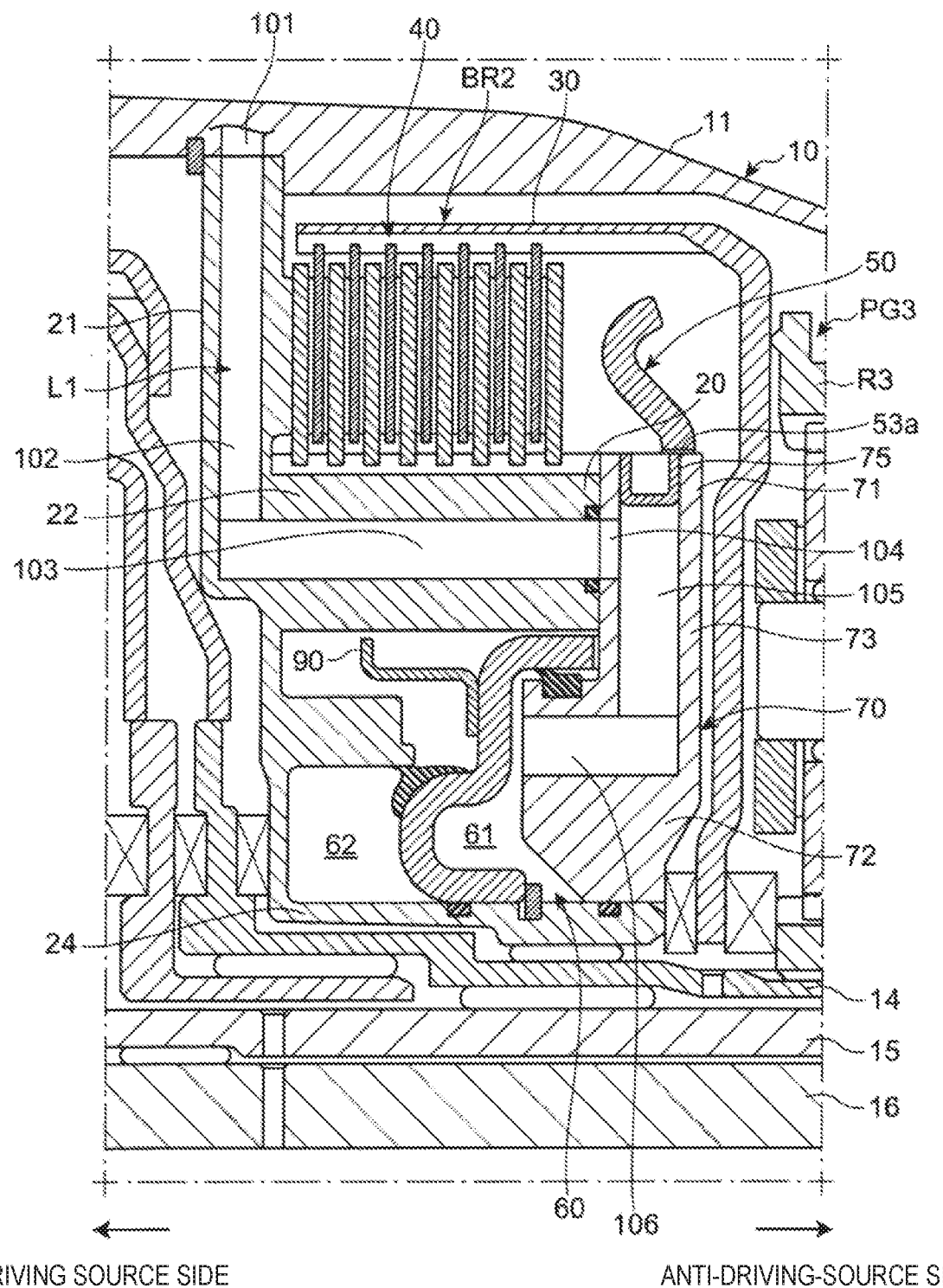
FIG. 5 is another cross-sectional view illustrating the brake and its periphery.
Figure 6:
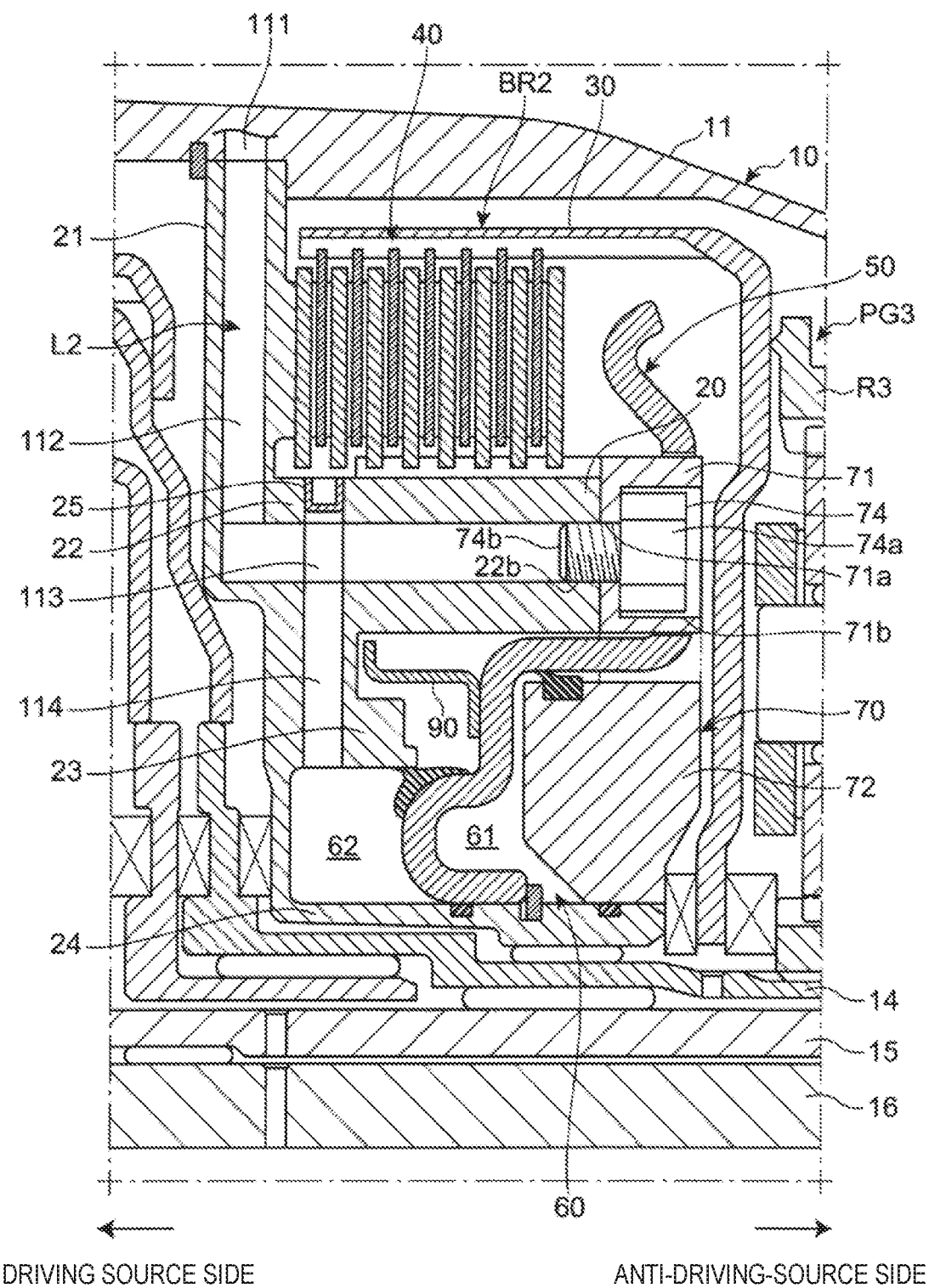
FIG. 6 is another cross-sectional view illustrating the brake and its periphery.
Figure 7:
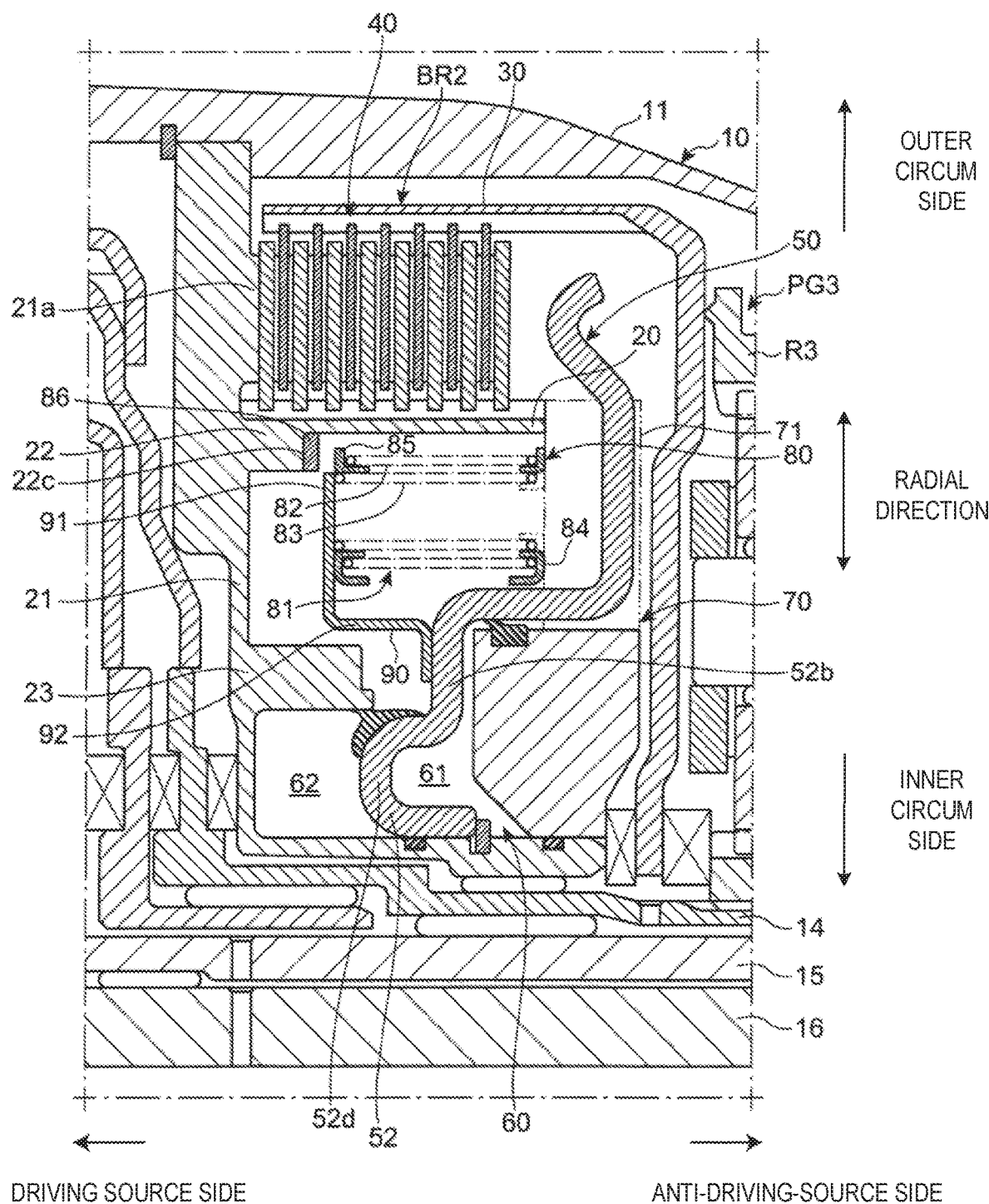
FIG. 7 is another cross-sectional view illustrating the brake and its periphery.

FIG. 3 is a cross-sectional view of the brake of the automatic transmission and its periphery, FIG. 4 is another cross-sectional view of the brake and its periphery, and FIGS. 5-7 are other cross-sectional views of the brake and its periphery. FIGS. 3-7 illustrate cross sections of the brake and its periphery, taken along lines Y3-Y3, Y4-Y4, Y5-Y5, Y6-Y6, and Y7-Y7 in FIG. 9, respectively, as will be described in detail.

As illustrated in FIGS. 3-7, the brake BR2 is accommodated in the transmission case 11 formed in a substantially cylindrical shape. The brake BR2 is disposed at an outer circumferential surface of a power transmission member 14 which is coupled to the sun gear S3 of the third gear set PG3 so as to be integrated with one of a pair of inner and outer rotary members of the first, second, and third clutches CL1, CL2, and CL3.

The power transmission member 14 is disposed at an outer circumferential surface of a power transmission member 15 which couples the carrier C2 of the second gear set PG2 to the carrier C4 of the fourth gear set PG4, and the power transmission member 15 is disposed at an outer circumferential surface of a power transmission member 16 which couples the sun gear S1 of the first gear set PG1 (specifically, the second sun gear S1b) to the sun gear S4 of the fourth gear set PG4.

The brake BR2 includes a hub member 20 coupled to the transmission case 11, a drum member 30 which is disposed on the anti-driving-source side of the hub member 20 and is coupled to the ring gear R3 of the third gear set PG3, a plurality of friction plates 40 placed in line in the axial directions between the hub member 20 and the drum member 30, and a piston 50 which is disposed on the anti-drivingsource side of the plurality of friction plates 40 and causes the plurality of friction plates 40 to be engaged.

The brake BR2 has a hydraulic chamber 60 to which hydraulic fluid which biases the piston 50 is supplied, and the hydraulic chamber 60 includes a hydraulic chamber 61 for engagement to which hydraulic fluid for engagement which biases the piston 50 in the engaging direction is supplied, and a hydraulic chamber 62 for release which is disposed at the opposite side of the piston 50 from the hydraulic chamber 61 for engagement, and to which hydraulic fluid for release which biases the piston 50 in the releasing direction is supplied.

As illustrated in FIG. 5, the brake BR2 also has an oil channel forming member 70 which forms a supply oil channel for engagement which supplies hydraulic fluid to the hydraulic chamber 61 for engagement, and the oil channel forming member 70 is disposed on the anti-driving-source side of the piston 50 and is coupled to the anti-driving-source side of the hub member 20.

As illustrated in FIG. 7, the brake BR2 also has a biasing unit 80 provided with a biasing member 81 which biases the piston 50, and the biasing unit 80 includes, as the biasing member 81, first springs 82 and second springs 83 which bias the piston 50 in the engaging direction, as first biasing members and second biasing members. That is, the biasing member 81 may be referred to as a spring.

Figure 8:
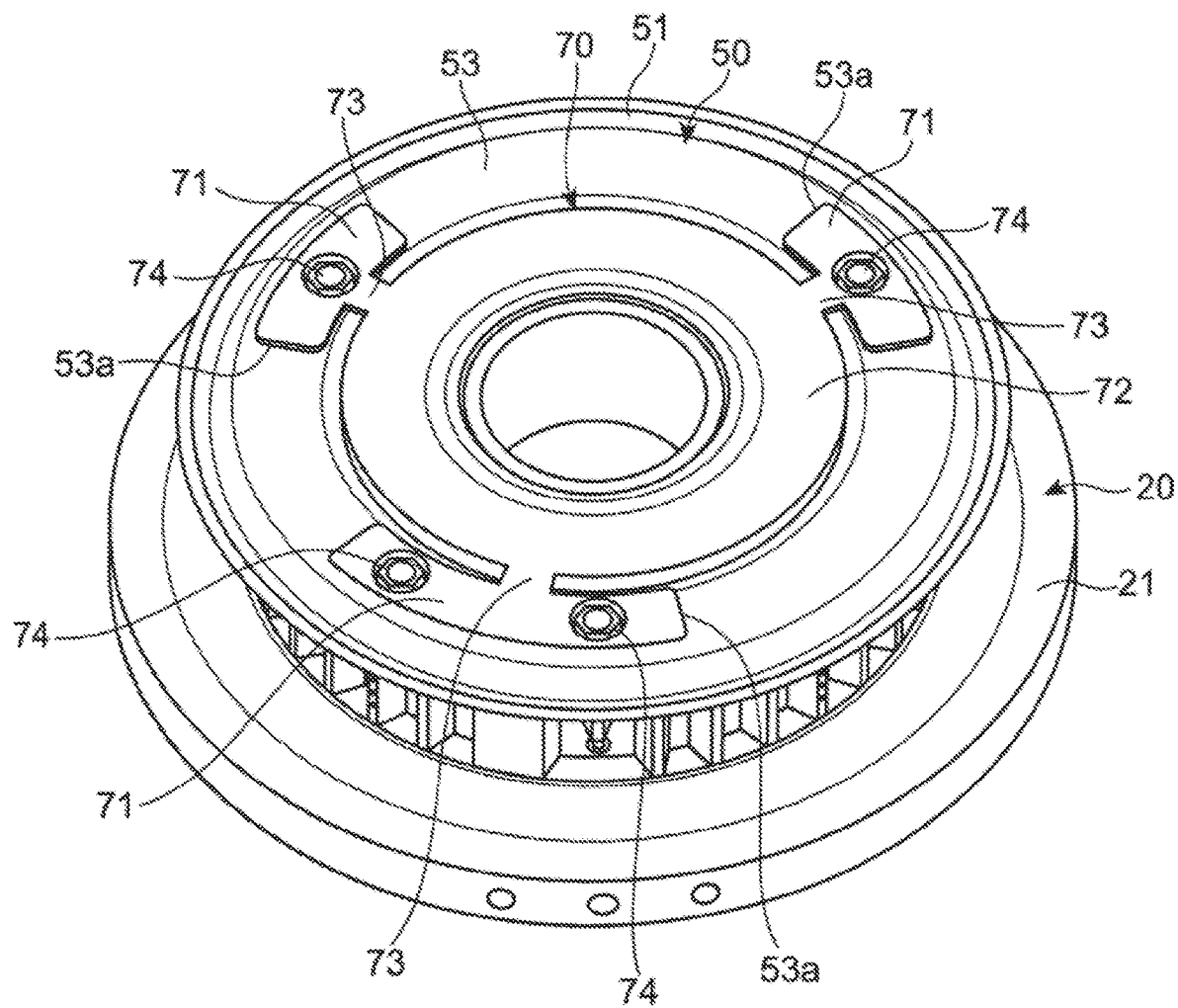
FIG. 8 is a perspective view illustrating an assembled state of a hub member, a biasing unit, an oil channel forming member, and a piston of the brake.
Figure 9:
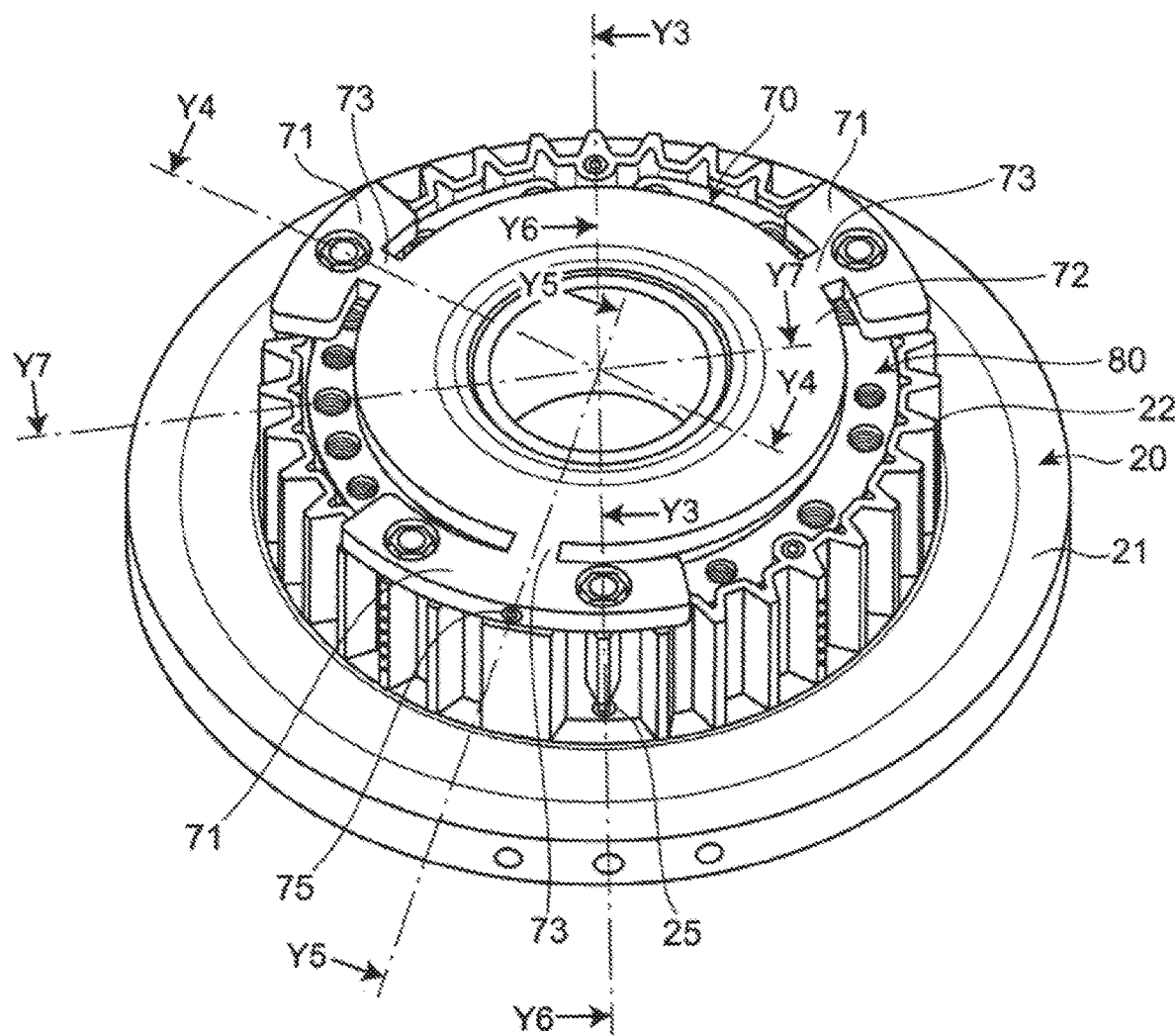
FIG. 9 is a perspective view illustrating an assembled state of the hub member, the biasing unit, and the oil channel forming member of the brake.
Figure 10:
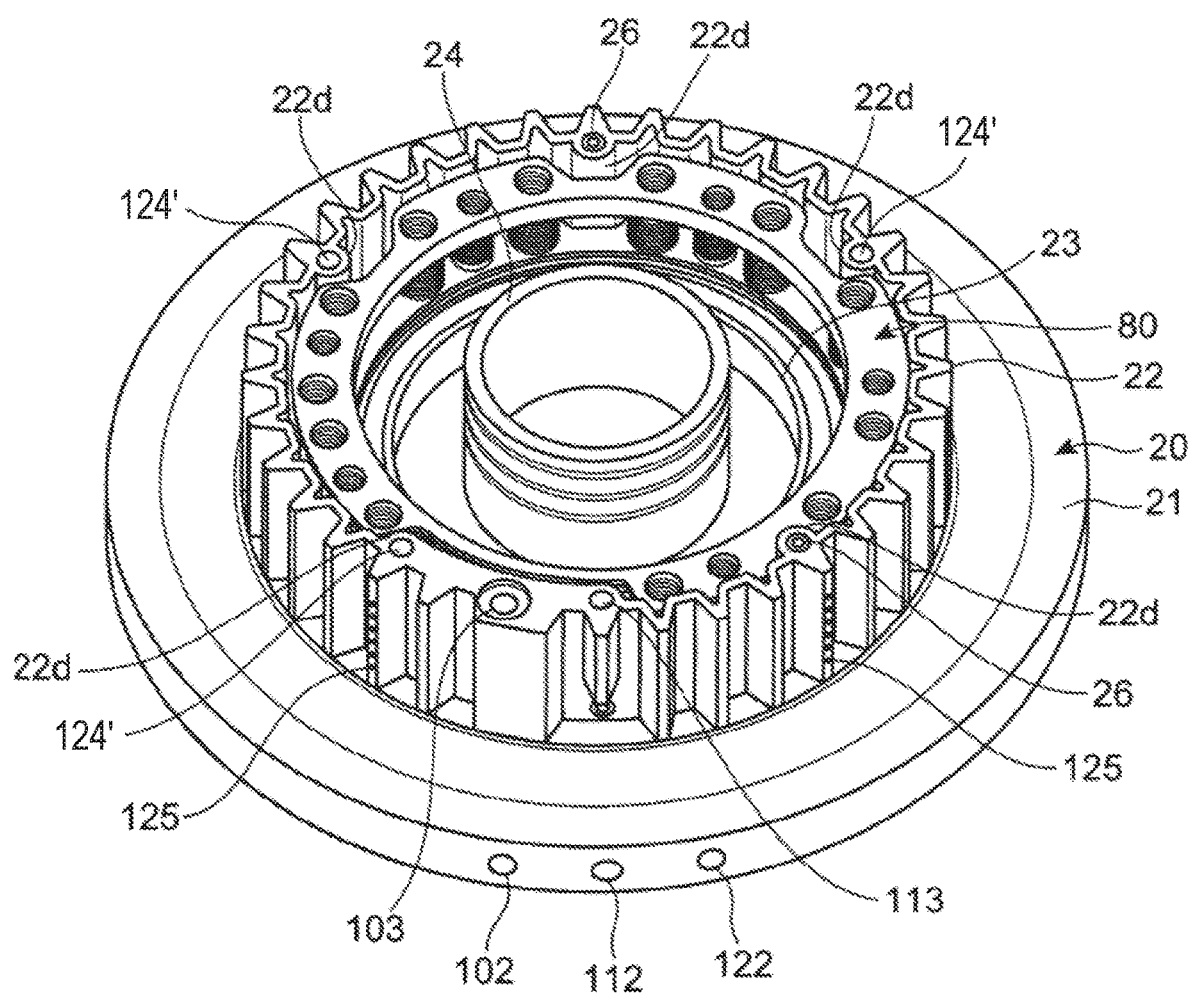
FIG. 10 is a perspective view illustrating an assembled state of the hub member and the biasing unit of the brake.
Figure 11:
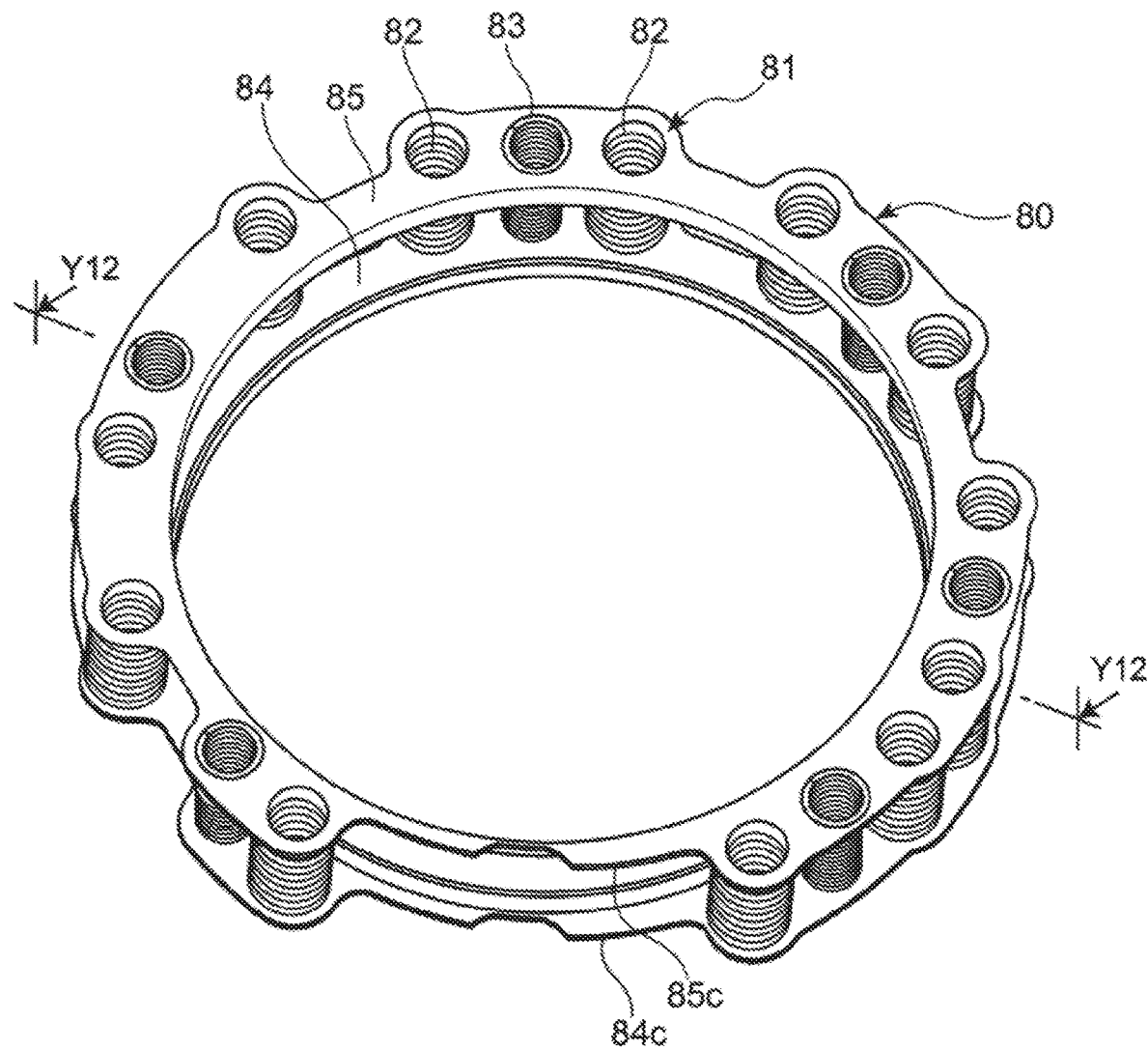
FIG. 11 is a perspective view illustrating the biasing unit.
Figure 12:
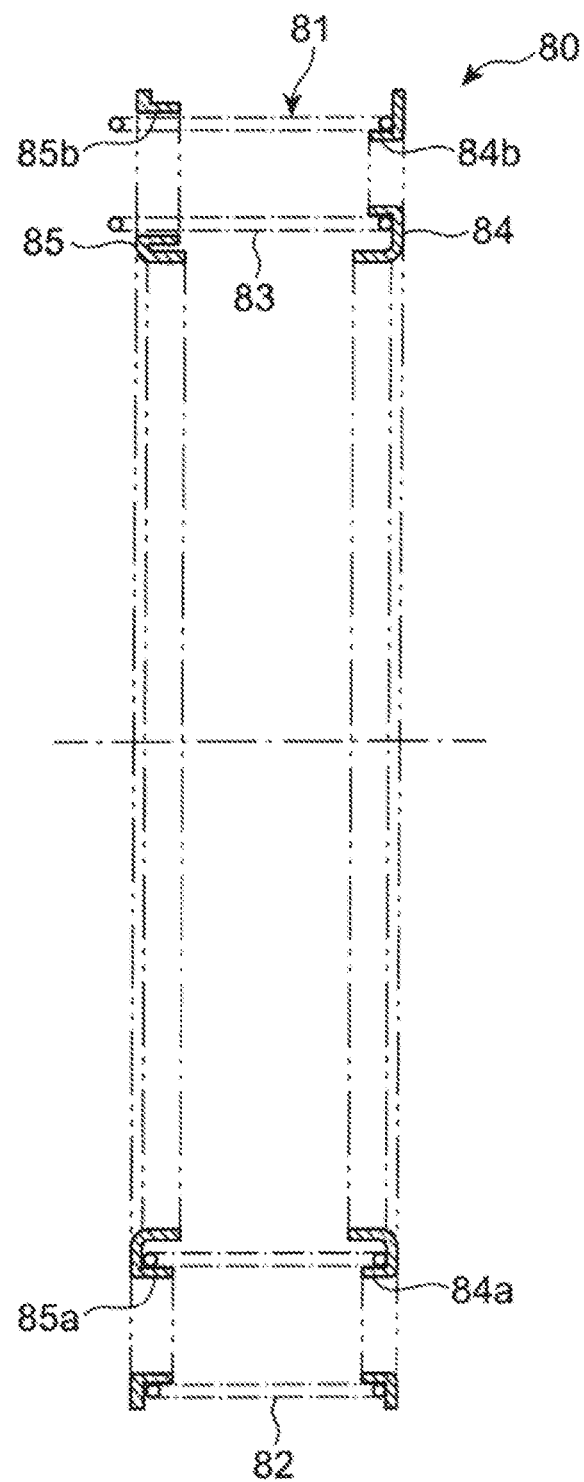
FIG. 12 is a cross-sectional view illustrating the biasing unit taken along a line Y12-Y12 in FIG. 11.

FIG. 8 is a perspective view illustrating an assembled state of the hub member, the biasing unit, the oil channel forming member, and the piston of the brake, and FIG. 9 is a perspective view illustrating an assembled state of the hub member, the biasing unit, and the oil channel forming member of the brake, FIG. 10 is a perspective view illustrating an assembled state of the hub member and the biasing unit of the brake, FIG. 11 is a perspective view illustrating the biasing unit, and FIG. 12 is a cross-sectional view illustrating the biasing unit taken along a line Y12-Y12 in FIG. 11.

As illustrated in FIGS. 3-10, the hub member 20 includes a vertical wall part 21 which extends in a direction perpendicular to the axial directions of the transmission case 11 and having a substantially annular shape, as well as a first cylinder part 22, a second cylinder part 23, and a third cylinder part 24 which extend to the anti-driving-source side from the vertical wall part 21 and each having a substantially cylindrical shape.

The first cylinder part 22 extends axially from the radially center side of the vertical wall part 21, the second cylinder part 23 extends axially from the vertical wall part 21, at a location radially inward of the first cylinder part 22, and the third cylinder part 24 extends axially from the vertical wall part 21, at a location radially inward of the second cylinder part 23. The first cylinder part 22 is longer in the axial directions than the second cylinder part 23, and is shorter in the axial directions than the third cylinder part 24.

The hub member 20 is fitted into a groove portion 11a for the hub member which is formed in an inner circumferential surface of the transmission case 11 to have a substantially cylindrical shape according to the shape of the vertical wall part 21, and is prevented by a snap ring 17 from coming out to the driving source side. The hub member 20 is coupled to the transmission case 11 by fixing the vertical wall part 21 to the transmission case 11 by using a rotation stop pin (not illustrated).

A spline 22a is formed in an outer circumferential surface of the first cylinder part 22 of the hub member 20 so that the first cylinder part 22 constitutes an inner stationary member coupled to the transmission case 11. Stationary-side friction plates 41 which constitute the friction plates 40 spline-engage with the spline 22a. The second cylinder part 23 and the third cylinder part 24 constitute a cylinder 62a of the hydraulic chamber 62 for release together with the vertical wall part 21.

The drum member 30 includes a cylinder part 31 which is disposed at the outer circumferential side of the first cylinder part 22 of the hub member 20 so as to oppose the first cylinder part 22 and extends axially to have a substantially cylindrical shape, and a vertical wall part 32 which extends in a direction perpendicular to the axial directions of the transmission case 11 from the anti-driving-source side of the cylinder part 31 radially inwardly to have a substantially disk shape.

The vertical wall part 32 of the drum member 30 is coupled to the ring gear R3. A spline 31a is formed in an inner circumferential surface of the cylinder part 31 of the drum member 30 so that the cylinder part 31 constitutes the outer rotary member coupled to the ring gear R3 as the rotary member. Rotary-side friction plates 42 which constitute the friction plates 40 spline-engage with the spline 31a. The stationary-side friction plates 41 and the rotary-side friction plates 42 are disposed alternately in the axial directions.

The piston 50 is disposed between the hub member 20 and the drum member 30, in more detail, between the first cylinder part 22 of the hub member 20 and the cylinder part 31 of the drum member 30, and is slidably fitted onto the outer circumferential side of the third cylinder part 24 of the hub member 20. The piston 50 is prevented by a snap ring 18 from coming out to the anti-driving-source side.

The piston 50 includes a pressing part 51 which is formed annularly and is provided at the outer circumferential side of the piston 50 to press the friction plates 40, a hydraulic chamber forming part 52 for engagement which is provided at the inner circumferential side and forms the hydraulic chamber 61 for engagement, and a coupling part 53 which couple the pressing part 51 to the hydraulic chamber forming part 52 for engagement, and extend radially.

The pressing part 51 is disposed on the anti-driving-source side of the friction plates 40, the hydraulic chamber forming part 52 for engagement is disposed radially inward of the first cylinder part 22 of the hub member 20, and the coupling part 53 is provided so as to be coupled to the hydraulic chamber forming part 52 for engagement through the anti-driving-source side of the first cylinder part 22 of the hub member 20 from the pressing part 51. The pressing part 51 and the hydraulic chamber forming part 52 for engagement are provided so as to project to the driving source side from the coupling part 53.

As illustrated in FIGS. 5 and 6, the oil channel forming member 70 is disposed on the anti-driving-source side of the piston 50. The oil channel forming member 70 is fitted onto the outer circumferential side of the third cylinder part 24 of the hub member 20, and is coupled to the anti-driving source side of the first cylinder part 22 of the hub member 20.

The oil channel forming member 70 includes bonding parts 71 which are provided at the outer circumferential side, and are coupled to the anti-driving-source side of the first cylinder part 22 of the hub member 20, a hydraulic chamber forming part 72 for engagement which is provided at the inner circumferential side and is disposed on the anti-driving-source side of the piston 50 to form the hydraulic chamber 61 for engagement, and coupling parts 73 which couple the bonding parts 71 to the hydraulic chamber forming part 72 for engagement, and extends radially.

The hydraulic chamber forming part 72 for engagement is formed annularly and has a given thickness, and as illustrated in FIG. 3, it is fitted into a space between the third cylinder part 24 of the hub member 20 and the outer circumferential side of the hydraulic chamber forming part 52 for engagement of the piston 50. The hydraulic chamber 61 for engagement is comprised of the hydraulic chamber forming part 52 for engagement of the piston 50, the hydraulic chamber forming part 72 for engagement of the oil channel forming member 70, and the third cylinder part 24 of the hub member 20.

As illustrated in FIGS. 4 and 6, the bonding parts 71 are formed so as to have the thickness less than that of the hydraulic chamber forming part 72 for engagement, and are provided so as to overlap in the axial directions with the anti-driving-source side of the hydraulic chamber forming part 72 for engagement. As illustrated in FIGS. 8 and 9, each bonding part 71 is formed in an arc shape. The oil channel forming member 70 is provided with a plurality of bonding parts 71 (in this embodiment, three bonding parts 71) in the circumferential directions, which separate substantially equally from each other in the circumferential directions.

Each bonding part 71 is formed with a bolt insertion hole 71a into which a fastening bolt 74 is inserted as a fastening member, and a bolt accommodation hole 71b in which a head 74a of the fastening bolt 74 is accommodated. The oil channel forming member 70 is coupled to the anti-driving-source side of the first cylinder part 22 by threadedly engaging through the bolt insertion holes 71a the fastening bolts 74 with threaded holes 22b formed on the anti-driving-source side of the first cylinder part 22 of the hub member 20. As the fastening bolts 74, a sealed bolt in which an outer circumferential surface of a thread part 74b is covered with a sealant is used.

Each coupling part 73 of the oil channel forming member 70 has substantially the same thickness as the bonding part 71, and as illustrated in FIGS. 8 and 9, it extends radially inward from the circumferentially center side of the bonding part 71 and is coupled to the hydraulic chamber forming part 72 for engagement.

As illustrated in FIG. 9, one of the bonding parts 71 disposed at the lower side of the transmission case 11 is coupled to the first cylinder part 22 by using the two fastening bolts 74 at both sides in the circumferential directions, and each of other two bonding parts 71 disposed at the upper side of the transmission case 11 is coupled to the first cylinder part 22 by using one fastening bolt 74 at the center in the circumferential directions.

Cutoff parts 53a are formed in the coupling part 53 of the piston 50 so that the coupling part 53 is cutoff in substantially the same shape as the bonding parts 71 and the coupling parts 73 of the oil channel forming member 70. The oil channel forming member 70 is disposed within a radial range of the piston 50, and is disposed at a position where the bonding parts 71 and the coupling parts 73 of the oil channel forming member 70 overlap with the coupling part 53 of the piston 50 in the axial directions by being fitted into the cutoff parts 53a of the coupling part 53 of the piston 50. Thus, the automatic transmission can be radially downsized by disposing the oil channel forming member 70 within the radial range of the piston 50.

As illustrated in FIG. 3, the hydraulic chamber forming part 52 for engagement of the piston 50 includes an outer cylinder part 52a which is fitted onto the outer circumferential side of the hydraulic chamber forming part 72 for engagement of the oil channel forming member 70 and extends axially, an oil-pressure receiving part 52b for engagement which extends radially inward from the driving source side of the outer cylinder part 52a, and an inner cylinder part 52c which extends to the anti-driving-source side from the radially inward of the oil-pressure receiving part 52b for engagement, is fitted into the third cylinder part 24 of the hub member 20, and extends axially.

In this automatic transmission 10, the hydraulic chamber 60 is disposed radially inward of the first cylinder part 22 of the hub member 20, and the hydraulic chamber 61 for engagement and the hydraulic chamber 62 for release are disposed radially inward of the first cylinder part 22.

As described above, the hydraulic chamber 61 for engagement is formed by the hydraulic chamber forming part 52 for engagement of the piston 50, the hydraulic chamber forming part 72 for engagement of the oil channel forming member 70, and the third cylinder part 24 of the hub member 20. The inner cylinder part 52c of the piston 50 is prevented by the snap ring 18 from coming out to the anti-driving-source side.

As illustrated in FIG. 3, a radially inward part of the oil-pressure receiving part 52b for engagement of the piston 50 is bulged to the driving source side into a substantially channel shape in the cross section to form a bulged part 52d. The bulged part 52d is slidably fitted into the cylinder 62a of the hub member 20 through seal members 63 and 64. The hydraulic chamber 62 for release is formed by the bulged part 52d of the piston 50 and the cylinder 62a of the hub member 20.

In this automatic transmission 10, the hydraulic chamber 62 for release has a smaller outer diameter than the hydraulic chamber 61 for engagement, and a biasing force receiving member 90 is disposed at the outer circumferential side of the hydraulic chamber 62 for release. The biasing force receiving member 90 is coupled to the piston 50 and receives a biasing force caused by the biasing member 81 of the biasing unit 80. Thus, the space at the outer circumferential side of the hydraulic chamber 62 for release can be used effectively.

As illustrated in FIG. 7, the biasing force receiving member 90 is formed annularly, and includes a radially extended part 91 extending radially between the first cylinder part 22 and the second cylinder part 23 of the hub member 20, and an axially extended part 92 extending axially to the anti-driving-source side from the radially inward of the radially extended part 91.

The biasing force receiving member 90 is coupled to the piston 50 by coupling the anti-driving-source side of the axially extended part 92 to a part of the oil-pressure receiving part 52b for engagement of the piston 50 radially outward of the bulged part 52d. The biasing unit 80 provided with the biasing member 81 is attached between the biasing force receiving member 90 (specifically, the radially extended part 91) and the oil channel forming member 70.

As illustrated in FIGS. 11 and 12, the biasing unit 80 includes the first springs 82 and the second springs 83 which extend axially, a first retainer plate 84 which holds one ends of the first springs 82 and the second springs 83 at the anti-driving-source side, and a second retainer plate 85 which is axially separated from the first retainer plate 84 and holds the other end of the first springs 82 at the driving source side.

The first retainer plate 84 is formed annularly, and is provided with a first spring guide part 84a and a second spring guide part 84b which project cylindrically to the driving source side and to which the first springs 82 and the second springs 83 are attached. The first springs 82 and the second springs 83 are disposed at different circumferential positions but radially overlap with each other. Thus, the automatic transmission can be shortened in the radial dimensions. In this automatic transmission 10, the first spring 82 is disposed at both sides of each of the six second springs 83 in the circumferential directions.

The second retainer plate 85 is formed substantially symmetry in the axial directions to the first retainer plate 84. The second retainer plate 85 includes a first spring guide part 85a which projects cylindrically to the anti-driving-source side and to which the first springs 82 are attached. The second retainer plate 85 is formed with insertion holes 85b into which the second springs 83 are inserted so that the other ends of the second springs 83 at the driving source side can project to the driving source side.

The first springs 82 have a larger biasing force than the second springs 83. The first springs 82 and the second springs 83 are coil springs, and the first springs 82 are large-sized coil springs which have a larger coil diameter than the second springs 83. The second springs 83 have a longer free length than the first springs 82, and the other ends of the second springs 83 are held by the first retainer plate 84 so as to be projectable from the second retainer plate 85 to the driving source side.

As illustrated in FIG. 7, the biasing unit 80 is attached to the transmission case 11 by the first retainer plate 84 being supported at the driving source side on both sides in the circumferential directions of the bonding parts 71 of the oil channel forming member 70, and the second retainer plate 85 being supported at the anti-driving-source side of the radially extended part 91 of the biasing force receiving member 90.

The radially extended part 91 of the biasing force receiving member 90 is formed to have the radial dimension which is smaller than the outer diameter of the second retainer plate 85 and is substantially the same as that of the second spring 83 so that it supports the second retainer plate 85, and supports the other end parts of the second springs 83 inserted into the insertion holes 85b of the second retainer plate 85.

The inner circumferential surface of the first cylinder part 22 of the hub member 20 is formed radially larger than the first retainer plate 84 and the second retainer plate 85, and the biasing unit 80 is disposed at the inner circumferential side of the first cylinder part 22. The inner circumferential surface of the first cylinder part 22 of the hub member 20 projects radially inward at the driving source side to form a stepped part 22c, and a stop member 86 is attached to the anti-driving-source side of the stepped part 22c.

The stop member 86 is formed radially smaller than the radially extended part 91 of the biasing force receiving member 90 and larger than the second retainer plate 85 so that it stops the second retainer plate 85 when the second retainer plate 85 is moved to the driving source side by receiving the biasing force of the biasing member 81.

The piston 50 is adjusted to be located at an immediately-before-contact position where it is immediately before contacting the plurality of friction plates 40 when the second retainer plate 85 supported by the biasing force receiving member 90 contacts the stop member 86. The immediately-before-contact position of the piston 50 is suitably adjusted between the released position where the plurality of friction plates 40 become in the released state and the zero clearance position where the plurality of friction plates 40 become in the zero clearance state. The stop member 86 may be comprised of a plurality of stop members, each formed in an arc shape having a given length in the circumferential directions and is separated from one another in the circumferential directions, or may be formed an annular shape covering the entire circumference.

When the second retainer plate 85 contacts the biasing force receiving member 90, the biasing force receiving member 90 receives the biasing force only from the first springs 82 in the engaging direction. The piston 50 is adjusted to be located at the zero clearance position when the first springs 82 become the free length.

Thus, the biasing unit 80 is constructed so that the first springs 82 make the biasing force act in the engaging direction on the piston 50 through the biasing force receiving member 90 from the released position to the immediately-before-contact position, and the second springs 83 make the biasing force act in the engaging direction on the piston 50 through the biasing force receiving member 90 from the released position to the zero clearance position. Thus, the brake BR2 can move the piston 50 to the zero clearance position with sufficient response and with sufficient accuracy.

Then, when the hydraulic pressure for engagement is supplied to the hydraulic chamber 61 for engagement while the piston 50 is at the zero clearance position, accordingly, the piston 50 pushes to move the plurality of friction plates 40 to the engaged position where the plurality of friction plates 40 become in the engaged state in which the plurality of friction plates 40 cannot be relatively rotatable by being pinched between the piston 50 and a holding part 21a which projects to the anti-driving-source side from the vertical wall part 21 of the hub member 20.

On the other hand, when the hydraulic pressure for engagement is released from the hydraulic chamber 61 for engagement and the hydraulic pressure for release is supplied to the hydraulic chamber 62 for release while the piston 50 is at the engaged position, the piston 50 is biased in the releasing direction and is moved to the zero clearance position.

Further, the piston 50 is biased in the releasing direction against the biasing forces of the first springs 82, and is moved to the immediately-before-contact position. Subsequently, the piston 50 is biased in the releasing direction against the biasing forces of the first springs 82 and the second springs 83, and is moved to the released position.

In this automatic transmission 10, the hydraulic chamber 60 is disposed at a different radial position from the biasing member 81 but axially overlaps with the biasing member 81. In detail, the hydraulic chamber 61 for engagement and the hydraulic chamber 62 for release are disposed at different radial positions from the first springs 82 and the second springs 83 but axially overlap with the first springs 82 and the second springs 83. Thus, the automatic transmission can be shortened in the axial directions.

Next, the supply oil channel which supplies the hydraulic fluid to the brake BR2 is described. A supply oil channel L1 for engagement which supplies the hydraulic fluid for engagement to the hydraulic chamber 61 for engagement of the brake BR2, and a supply oil channel L2 for release which supplies the hydraulic fluid for release to the hydraulic chamber 62 for release of the brake BR2 are formed in the transmission case 11, the hub member 20, and the oil channel forming member 70. A supply oil channel L3 for lubrication which supplies the hydraulic fluid for lubrication to the friction plates 40 is formed in the transmission case 11 and the hub member 20.

As illustrated in FIG. 5, the supply oil channel L1 for engagement is comprised of a radial oil channel 102 which is provided in the vertical wall part 21 of the hub member 20 and extends radially, an axial oil channel 103 which is provided in the first cylinder part 22 of the hub member 20, extends axially, and is coupled to the radial oil channel 102, an axial oil channel 104 which is provided in the bonding parts 71 of the oil channel forming member 70, extends axially, and is coupled to the axial oil channel 103, a radial oil channel 105 which is provided in the bonding parts 71, the coupling parts 73, and the hydraulic chamber forming part 72 for engagement of the oil channel forming member 70, extends radially, and is coupled to the axial oil channel 104, and an axial oil channel 106 which is provided in the hydraulic chamber forming part 72 for engagement of the oil channel forming member 70, extends axially, is coupled to the radial oil channel 105, and opens to the hydraulic chamber 61 for engagement.

The radial oil channel 102 of the hub member 20 is coupled to a radial oil channel 101 which is provided in the transmission case 11 and extends radially. The radial oil channel 101 leads to a control valve unit (not illustrated) disposed below the transmission case 11. The control valve unit supplies a given hydraulic pressure for engagement by supplying the hydraulic fluid for engagement to the hydraulic chamber 61 for engagement through the radial oil channel 101 and the supply oil channel L1 for engagement.

The radial oil channel 105 of the oil channel forming member 70 is formed so as to extend radially inward from the outer circumferential surface of the bonding part 71 of the oil channel forming member 70, and a closing member 75 which closes the opening of the radial oil channel 105 is attached to the outer circumferential surface of the bonding part 71.

As illustrated in FIG. 6, the supply oil channel L2 for release is comprised of a radial oil channel 112 which is provided in the vertical wall part 21 of the hub member 20 and extends radially, an axial oil channel 113 which is provided in the first cylinder part 22 of the hub member 20, extends axially, and is coupled to the radial oil channel 112, and a radial oil channel 114 which is provided in the first cylinder part 22, the vertical wall part 21, and the second cylinder part 23 of the hub member 20, extends radially, is coupled to the axial oil channel 113, and opens to the hydraulic chamber 62 for release.

The radial oil channel 112 of the hub member 20 is coupled to a radial oil channel 111 which is provided in the transmission case 11 and extends radially. The radial oil channel 111 leads to the control valve unit. The control valve unit supplies a given hydraulic pressure for release by supplying the hydraulic fluid for release to the hydraulic chamber 62 for release through the radial oil channel 111 and the supply oil channel L2 for release.

The radial oil channel 114 of the hub member 20 is formed so as to extend radially inward from the outer circumferential surface of the first cylinder part 22 of the hub member 20, and closing members 25 which close the openings of radial oil channel 114 are attached to the outer circumferential surface of the first cylinder part 22.

The axial oil channel 113 of the hub member 20 is formed so as to extend axially to the driving source side from an end face on the anti-driving-source side of the first cylinder part 22 of the hub member 20, and the fastening bolts 74 are attached to the end face on the anti-driving-source side of the first cylinder part 22, as the closing members which close the openings of the axial oil channel 113.

The threaded holes 22b are formed in the openings of the axial oil channel 113 on the anti-driving-source side of the first cylinder part 22. The fastening bolts 74 which couple the oil channel forming member 70 to the hub member 20 are threadedly engaged with the threaded holes 22b, and the openings of the axial oil channel 113 are closed by using the fastening bolts 74. As the fastening bolt 74, a sealed bolt in which the outer circumferential surface of the thread part 74b is covered with the sealant is used.

Thus, since the fastening members 74 coupling the oil channel forming member 70 function as the closing members which close the openings of the axial oil channel 113 of the first cylinder part 22, the openings of the axial oil channel 113 can be closed without the number of components being increased.

As illustrated in FIG. 3, the supply oil channel L3 for lubrication is comprised of a radial oil channel 122 which is formed in the vertical wall part 21 of the hub member 20 and extends radially, circumferential oil channels 123 which are formed in the vertical wall part 21 of the hub member 20, arcuately extend in the circumferential directions, and are coupled to the radial oil channel 122, axial oil channels 124 which are formed in the first cylinder part 22 of the hub member 20, extend axially, and are coupled to the circumferential oil channels 123, radial oil channels 125 which are formed in the first cylinder part 22 of the hub member 20, extend radially, are coupled to the axial oil channels 124, and open to the outer circumferential surface of the first cylinder part 22 of the hub member 20.

A plurality of radial oil channels 125 which open to the outer circumferential surface of the first cylinder part 22 are formed with an interval therebetween in the axial directions so that they open to the respective teeth parts of the spline 22a. Preferably, the radial oil channels 125 are formed so as to open to tip ends of the teeth parts of the spline 22a. Note that the radial oil channels 125 may be formed so as to open to the bottoms of the teeth parts of the spline 22a.

The radial oil channel 122 of the hub member 20 is coupled to a radial oil channel 121 which is provided in the transmission case 11 and extends radially. The radial oil channel 121 leads to the control valve unit. The control valve unit can supply the hydraulic fluid for lubrication to the plurality of friction plates 40 through the radial oil channel 121 and the supply oil channel L3 for lubrication.

In this brake BR2, the hydraulic fluid for lubrication is supplied to the friction plates 40 from the outer circumferential surface of the first cylinder part 22 of the hub member 20 as the inner stationary member to cool the generated heat of the friction plates 40. The hydraulic fluid for lubrication supplied to the friction plates 40 moves to the inner circumferential surface of the cylinder part 31 of the drum member 30 as the outer rotary member, and moves in the axial directions by the rotation of the cylinder part 31 of the drum member 30, and thereby stagnation of the hydraulic fluid for lubrication is prevented.

The axial oil channels 124 of the hub member 20 are formed so as to extend axially to the driving source side from an end face on the anti-driving-source side of the first cylinder part 22 of the hub member 20, and closing members 26 which close the openings of the axial oil channels 124 are attached to the end face on the anti-driving-source side of the first cylinder part 22.

In this automatic transmission 10, as illustrated in FIG. 10, the radial oil channels 102, 112, and 122 which respectively constitute the supply oil channel L1 for engagement, the supply oil channel L2 for release, and the supply oil channel L3 for lubrication are sequentially disposed in the circumferential directions at a lower side of the transmission case 11. The circumferential oil channels 123 which constitute the supply oil channel L3 for lubrication are coupled to the radial oil channel 122, and arcuately extend in the circumferential directions away from the radial oil channel 112, and extend to the opposite side of the radial oil channel 102 from the radial oil channel 112.

The supply oil channel L3 for lubrication is provided with a plurality of (specifically, five) axial oil channels 124 coupled to the circumferential oil channels 123, which are substantially equally separated from each other in the circumferential directions, and the axial oil channels 124 are coupled to a plurality of radial oil channels 125 which open to the outer circumferential surface of the first cylinder part 22 of the hub member 20, respectively.

As illustrated in FIG. 3, the openings of two axial oil channels 124 which constitute the supply oil channel L3 for lubrication are closed by attaching the closing members 26 to the end face on the anti-driving-source side of the first cylinder part 22. The openings on the anti-driving-source side of three axial oil channels 124 which constitute the supply oil channel L3 for lubrication are closed by using the fastening bolts 74 which couple the oil channel forming member 70 to the hub member 20.

As illustrated in FIG. 4, axial oil channels 124' which constitute the supply oil channel L3 for lubrication are formed so as to extend axially to the driving source side from an end face on the anti-driving-source side of the first cylinder part 22 of the hub member 20, and the fastening bolts 74 are attached as the closing members which close openings of the axial oil channels 124' to the end face at the anti-driving-source side of the first cylinder part 22.

The threaded holes 22b are formed in the openings of the axial oil channels 124' on the anti-driving-source side of the first cylinder part 22 of the hub member 20. The fastening bolts 74 which couple the oil channel forming member 70 to the hub member 20 are threadedly engaged with the threaded holes 22b, and the openings of the axial oil channels 124' are closed by using the fastening bolts 74. As the fastening bolt 74, a sealed bolt in which the outer circumferential surface of the thread part 74b is covered with the sealant is used.

Thus, since the fastening members 74 coupling the oil channel forming member 70 function as the closing members which close the openings of the axial oil channels 124' of the first cylinder part 22, the openings of the axial oil channels 124' can be closed without the number of components being increased.

As illustrated in FIG. 10, the axial oil channels 103, 113, and 124 which constitute the supply oil channel L1 for engagement, the supply oil channel L2 for release, and the supply oil channel L3 for lubrication, respectively are formed at different circumferential positions, and are formed in boss parts 22d which project radially inward from the inner circumferential surface of the first cylinder part 22 of the hub member 20. As illustrated in FIG. 11, cutoff parts 84c and 85c are formed in the first retainer plate 84 and the second retainer plate 85 of the biasing unit 80, corresponding to the boss parts 22d, respectively.

Figure 13:
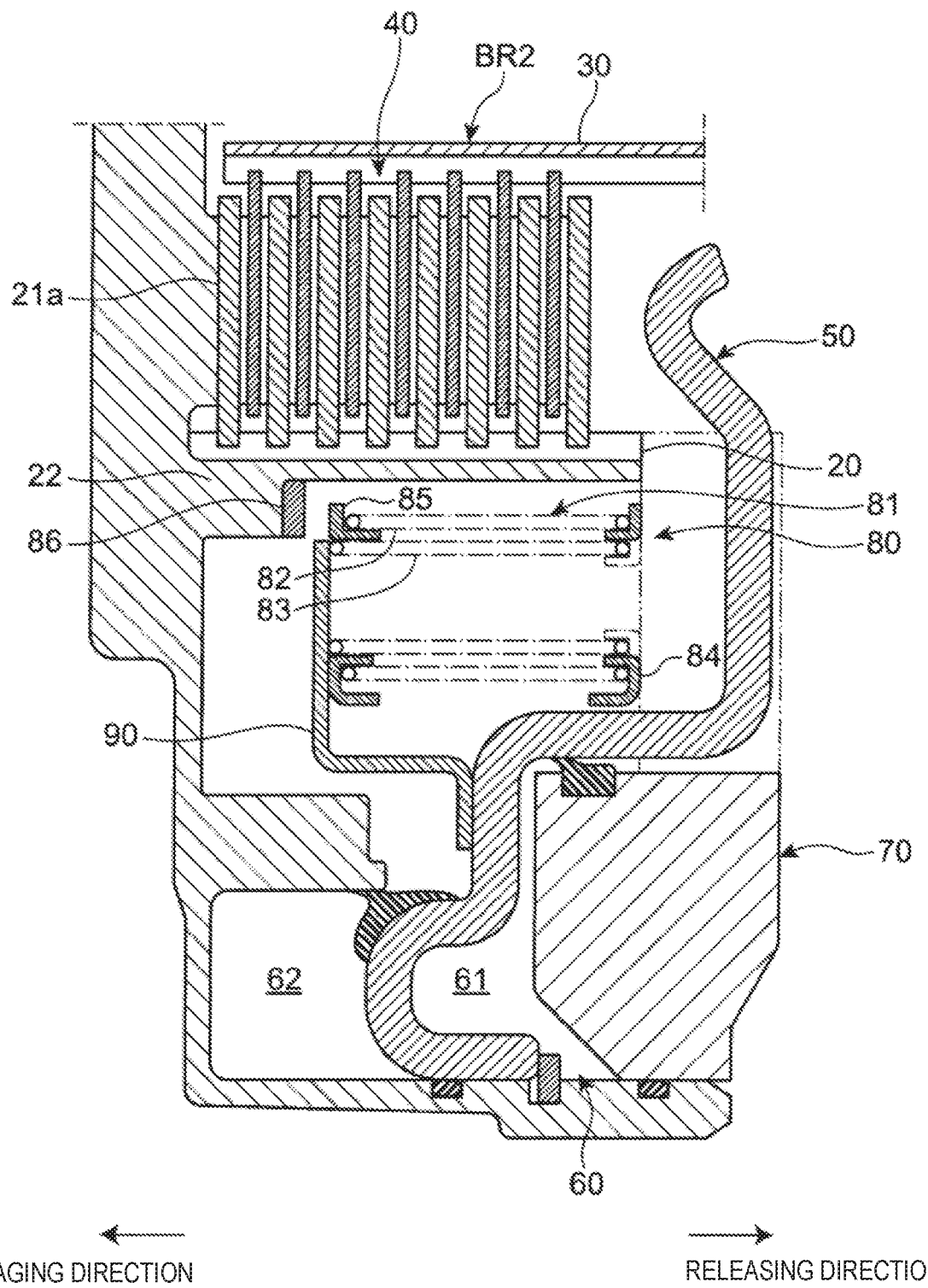
FIG. 13 is a cross-sectional view illustrating the brake in a released state.
Figure 14:
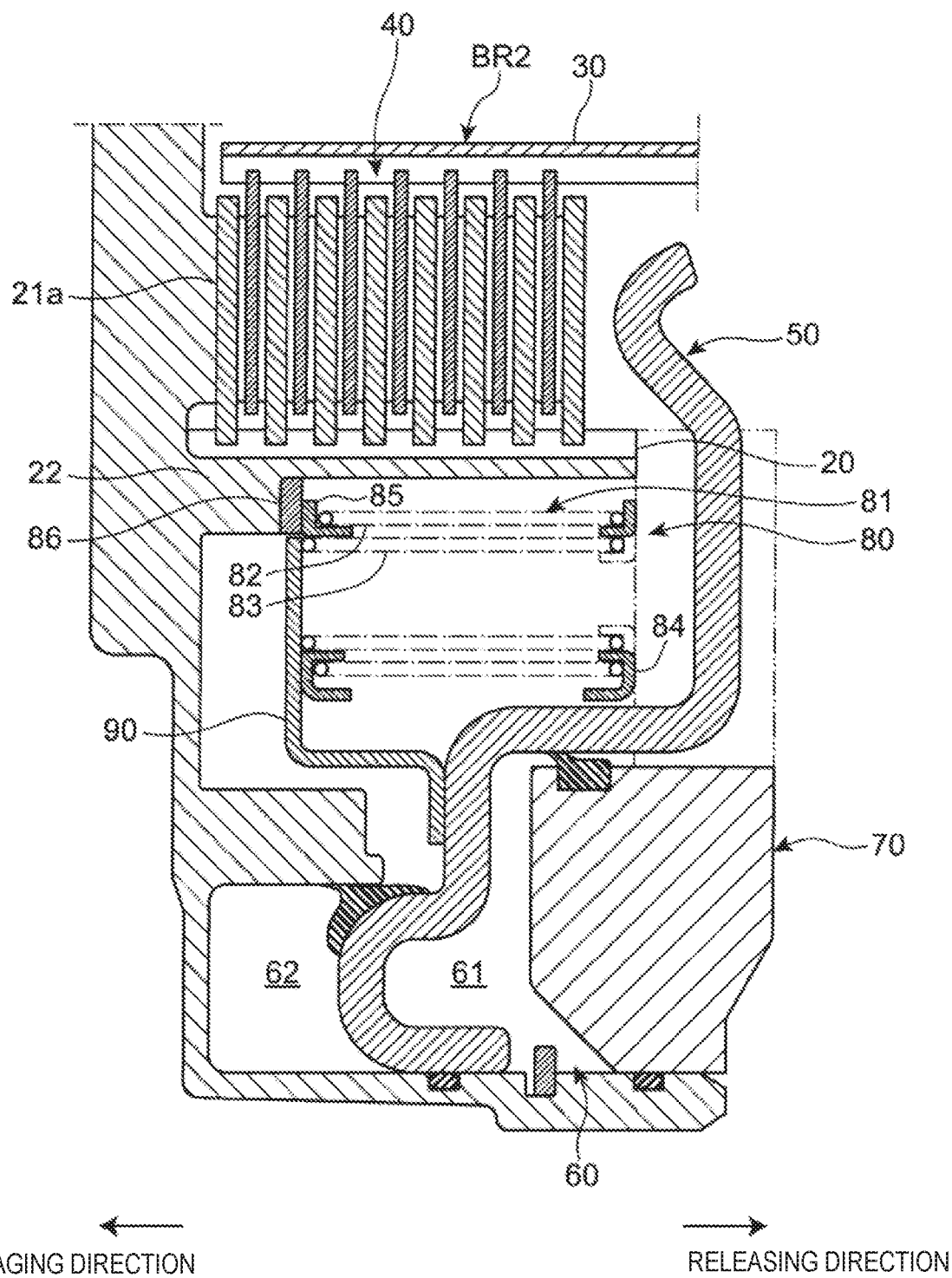
FIG. 14 is a cross-sectional view illustrating the brake in an immediately-before-contact state.
Figure 15:
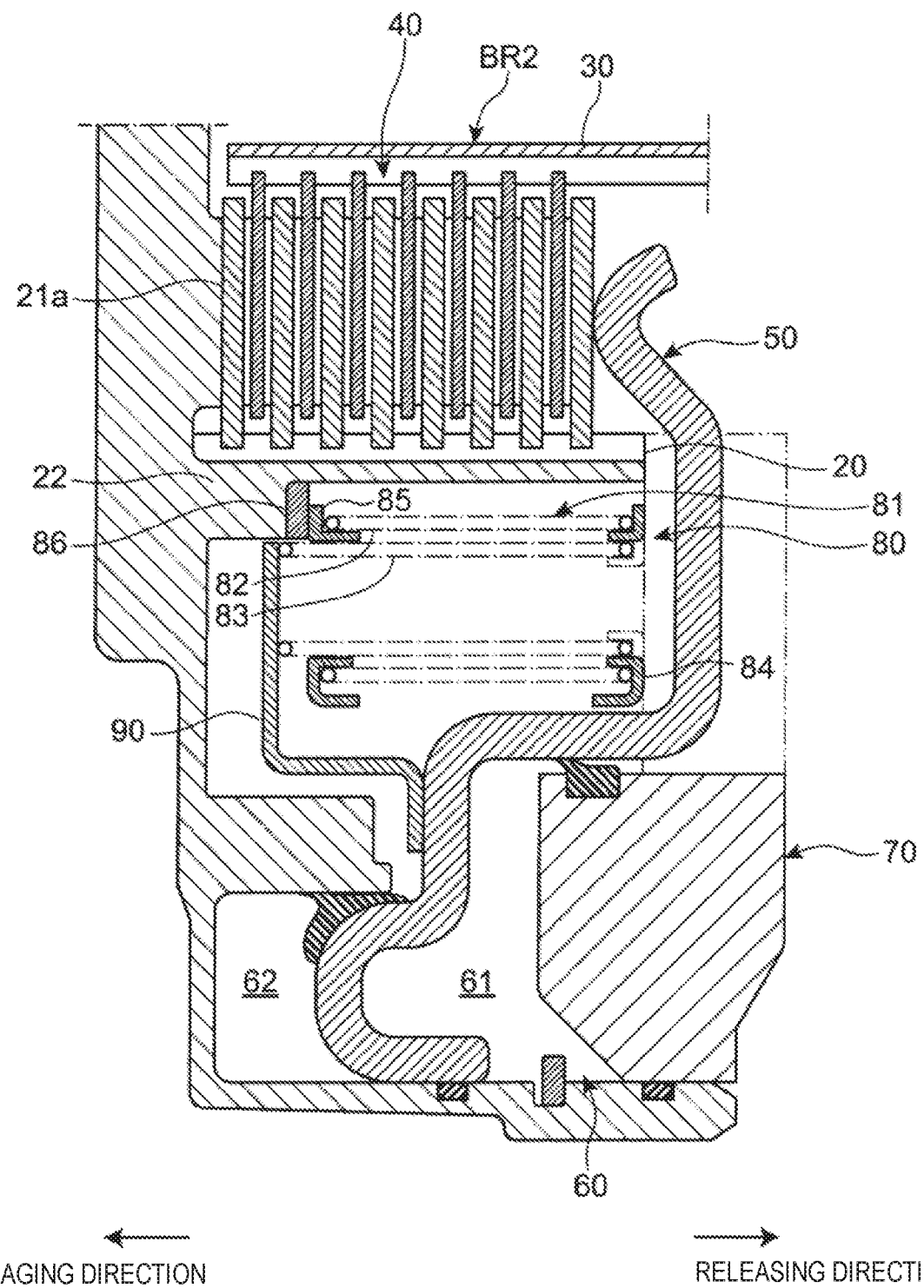
FIG. 15 is a cross-sectional view illustrating the brake in a zero clearance state.
Figure 16:
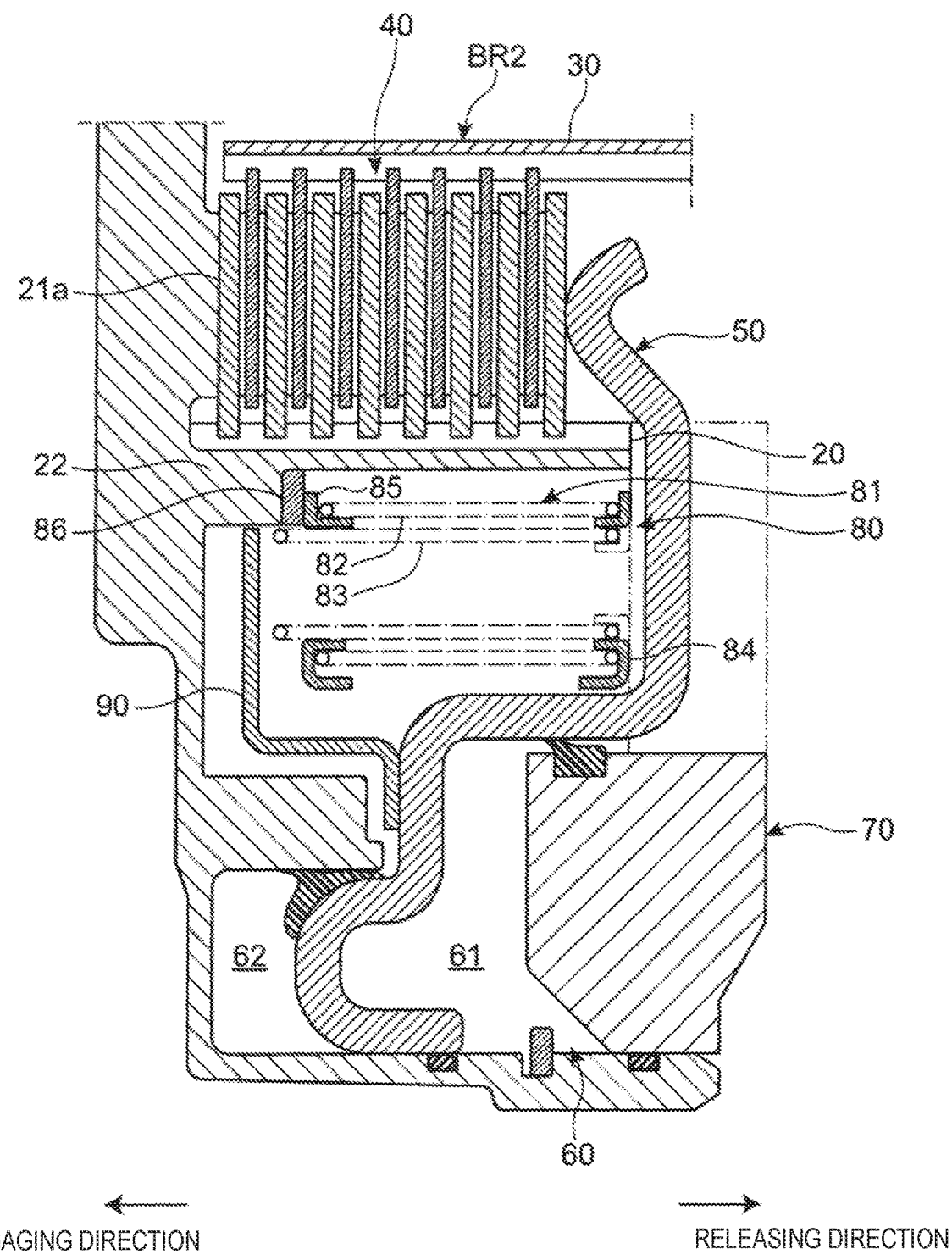
FIG. 16 is a cross-sectional view illustrating the brake in an engaged state.
Figure 17:
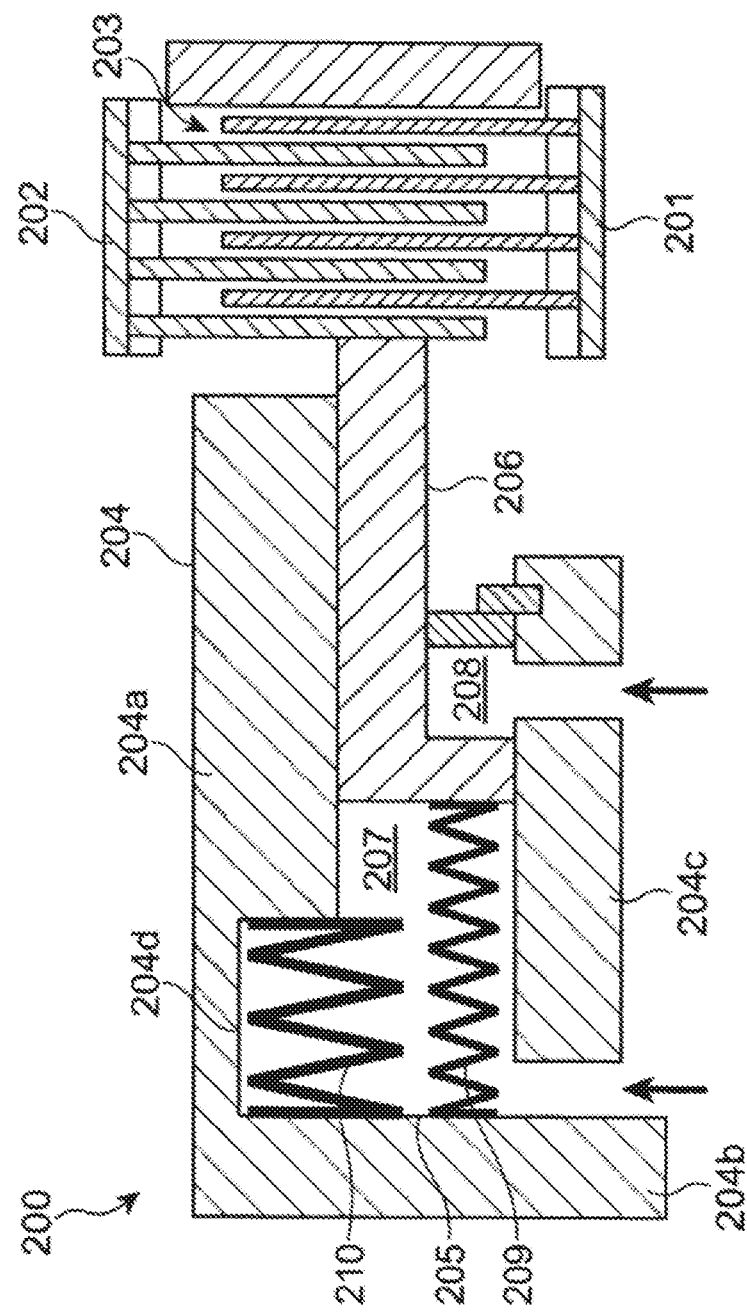
FIG. 17 is a cross-sectional view illustrating a brake of a conventional automatic transmission.

Next, operation of the brake BR2 constructed as above is described. FIG. 13 is a cross-sectional view illustrating the brake in the released state, FIG. 14 is a cross-sectional view illustrating the brake in the immediately-before-contact state, FIG. 15 is a cross-sectional view illustrating the brake in the zero clearance state, and FIG. 16 is a cross-sectional view illustrating the brake in the engaged state. FIGS. 13-16 are enlarged views illustrating substantial parts of the brake in FIG. 7.

In FIG. 13, the released state of the brake BR2 where the piston 50 is located at the released position in which the plurality of friction plates 40 become in the released state is illustrated. This released state of the brake BR2 is achieved by releasing the hydraulic pressure for engagement from the hydraulic chamber 61 for engagement, and supplying the hydraulic pressure for release to the hydraulic chamber 62 for release, to compress the first springs 82 and the second springs 83 through the biasing force receiving member 90 and move the piston 50 in the releasing direction, that is, toward the anti-driving-source side.

When engaging the brake BR2, the hydraulic pressure for release is released from the hydraulic chamber 62 for release in the released state illustrated in FIG. 13, and as illustrated in FIG. 14, the piston 50 is moved in the engaging direction, that is, toward the driving source side by receiving the biasing forces of the first springs 82 and the second springs 83 through the biasing force receiving member 90 until the second retainer plate 85 contacts the stop member 86, the piston 50 then reaches the immediately-before-contact position where the piston 50 is at a location just before contacting the plurality of friction plates 40, and thereby the brake BR2 becomes in the immediately-before-contact state.

When the second retainer plate 85 contacts the stop member 86 in the immediately-before-contact state, as illustrated in FIG. 15, the piston 50 is moved in the engaging direction by receiving the biasing force of the second springs 83 through the biasing force receiving member 90 until the second springs 83 reach the free length thereof, and the piston 50 is then located at the zero clearance position where the piston 50 contacts or substantially contacts the friction plates 40 without pressing the plurality of friction plates 40 to make the friction plates 40 become in the zero clearance state, and thereby the brake BR2 becomes in the zero clearance state.

When the hydraulic pressure for engagement is supplied to the hydraulic chamber 61 for engagement in the zero clearance state, as illustrated in FIG. 16, the piston 50 is biased and moved in the engaging direction by the hydraulic pressure for engagement supplied to the hydraulic chamber 61 for engagement, the piston 50 then pushes the plurality of friction plates 40 and reaches the engaged position where the plurality of friction plates 40 are unable to relatively rotate, and thereby the brake BR2 becomes in the engaged state.

On the other hand, when releasing the brake BR2, in the engaged state illustrated in FIG. 16, the hydraulic pressure for engagement is released from the hydraulic chamber 61 for engagement and the hydraulic pressure for release is supplied to the hydraulic chamber 62 for release, and the piston 50 is then biased and moved in the releasing direction, that is, toward the anti-driving-source side by the hydraulic pressure for release supplied to the hydraulic chamber 62 for release to become in the released state illustrated in FIG. 13 through the zero clearance state illustrated in FIG. 15 and the immediately-before-contact state illustrated in FIG. 14.

In this brake BR2, the piston 50 can be moved with sufficient response by the first springs 82 and the second springs 83 from the released position to the immediately-before-contact position, and can be moved with sufficient accuracy by the first springs 82 from the immediately-before-contact position to the zero clearance position.

As described above, the slip control of the brake BR2 is carried out when the vehicle starts traveling. When engaging the brake BR2, after the plurality of friction plates 40 are made into the slip state by supplying the oil pressure lower than the hydraulic pressure for engagement to the hydraulic chamber 61 for engagement, the hydraulic pressure for engagement is supplied to the hydraulic chamber 61 for engagement to engage the plurality of friction plates 40. On the other hand, when releasing the brake BR2, after the plurality of friction plates 40 are made into the slip state by supplying the oil pressure lower than the hydraulic pressure for release to the hydraulic chamber 62 for release, the hydraulic pressure for release is supplied to the hydraulic chamber 62 for release to disengage the plurality of friction plates 40.

When engaging and releasing the brake BR2, the hydraulic fluid for lubrication is supplied to the plurality of friction plates 40 through the supply oil channel L3 for lubrication, and when the slip control of the brake BR2 is carried out, the hydraulic fluid for lubrication is supplied to the plurality of friction plates 40 through the supply oil channel L3 for lubrication.

According to this embodiment, in this brake BR2 having the biasing member 81 which biases the piston 50 in the engaging direction, and the hydraulic chamber 62 for release to which the hydraulic fluid which biases the piston 50 in the opposite direction from the biasing direction of the biasing member 81 is supplied, the hydraulic chamber 62 for release is disposed at the different radial position from the biasing member 81 but axially overlaps with the biasing member 81, and thereby the automatic transmission can be downsized in the axial dimension.

Similarly for the friction engaging element having return spring(s) as the biasing member(s) which biases the piston 50 in the releasing direction, and a hydraulic chamber for engagement to which hydraulic fluid which biases the piston 50 in the opposite direction from the biasing direction of the return spring is supplied, the automatic transmission can be axially downsized by disposing the hydraulic chamber for engagement at a different radial position from the return spring but axially overlapping with the return spring.

Thus, the automatic transmission 10 according to this embodiment includes the friction engaging element BR2, which is provided with the plurality of friction plates 40, the piston 50 which causes the plurality of friction plates 40 to engage with each other, the biasing member 81 which biases the piston 50, and the hydraulic chamber 60 to which the hydraulic fluid which biases the piston 50 is supplied. The hydraulic chamber 60 is disposed at a different radial position from the biasing member 81 but axially overlaps with the biasing member 81.

Thus, in the automatic transmission 10 including the friction engaging element BR2 having the biasing member 81 which biases the piston 50, and the hydraulic chamber 60 to which the hydraulic fluid which biases the piston 50 is supplied, the automatic transmission 10 can be shortened in the axial dimensions as compared with the conventional automatic transmission in which the hydraulic chamber 60 does not axially overlap with the biasing member 81, and thereby it can be axially downsized, while securing the disposed space of the biasing member 81.

Moreover, since the biasing member 81 biases the piston 50 in the engaging direction, the automatic transmission 10 provided with the friction engaging element BR2 having the biasing member 81 which biases the piston 50 in the engaging direction can be axially downsized, while securing the disposed space of the biasing member 81.

Moreover, the hydraulic chamber 60 includes the hydraulic chamber 61 for engagement and the hydraulic chamber 62 for release, which are disposed at different radial positions from the biasing member 81 but axially overlap with the biasing member 81. Thus, the automatic transmission can be axially downsized as compared with the conventional automatic transmission in which the hydraulic chamber 61 for engagement and the hydraulic chamber 62 for release do not overlap with the biasing member 81 in the axial directions.

Moreover, the hydraulic chamber 62 for release is formed to have a smaller outer diameter than the hydraulic chamber 61 for engagement, and the biasing force receiving member 90 which is coupled to the piston 50 and receives the biasing force of the biasing member 81 is disposed at the outer circumferential side of the hydraulic chamber 62 for release. Thus, the biasing force receiving member 90 can be coupled to the piston 50 at the outer circumferential side of the hydraulic chamber 62 for release of which the outer diameter is formed smaller than the hydraulic chamber 61 for engagement, thereby effectively utilizing the space at the outer circumferential side of the hydraulic chamber 62 for release.

Moreover, the biasing member 81 includes the first biasing member 82 which exerts the biasing force from the released position to the immediately-before-contact position, and the second biasing member 83 which exerts the biasing force from the released position to the zero clearance position. The first biasing member 82 has the larger biasing force than the second biasing member 83.

Thus, the piston 50 can be moved with sufficient response from the released position to the immediately-before-contact position by the first biasing member 82 with the larger biasing force than the second biasing member 83, in addition to the second biasing member 83, and the piston 50 can be moved with sufficient accuracy from the immediately-before-contact position to the zero clearance position by the second biasing member 83, and thereby the piston 50 can be moved with sufficient response and with sufficient accuracy to the zero clearance position.

Since the piston 50 can be moved with sufficient accuracy to the zero clearance position, a shock caused by the piston 50 being located on the engagement side of the zero clearance position to press the friction plates 40, and a slowing of the response caused by the piston 50 being located on the releasing side of the zero clearance position, can be prevented.

The present disclosure is not limited to the illustrated embodiment and various improvements and various design changes are possible without departing from the subject matter of the present disclosure.

As described above, according to the present disclosure, since the automatic transmission provided with the friction engaging element having the biasing member which biases the piston, and the hydraulic chamber to which the hydraulic fluid which biases the piston is supplied is axially downsized, while securing the disposed space of the biasing member, it may also be suitably utilized in the manufacturing technology field of automatic transmissions and/or vehicles mounted with the automatic transmissions.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Automatic Transmission
11 Transmission Case
40 Friction Plate
50 Piston
60 Hydraulic Chamber
61 Hydraulic Chamber for Engagement
62 Hydraulic Chamber for Release
81 Biasing Member (Spring)
81 First Biasing Member (First Spring)

83 Second Biasing Member (Second Spring)
84 First Retainer Plate
85 Second Retainer Plate
85b Insertion Hole
90 Biasing Force Receiving Member
BR2 Second Brake (Friction Engaging Element)

What is claimed is:

1. An automatic transmission comprising a friction engaging element, the friction engaging element including:
    a plurality of friction plates disposed inside a transmission case;
    a piston configured to cause the plurality of friction plates to be engaged with each other;
    at least one spring configured to bias the piston in an engaging direction to cause the plurality of friction plates to be engaged with each other; and
    a hydraulic chamber for engagement to which hydraulic fluid to bias the piston in the engaging direction is supplied, and a hydraulic chamber for release disposed at an opposite side of the piston from the hydraulic chamber for engagement, the hydraulic chamber for release being supplied with hydraulic fluid to bias the piston in a releasing direction opposite from the engaging direction,
    wherein the hydraulic chamber for engagement and the hydraulic chamber for release are each disposed at a different radial position from the at least one spring but axially overlap with the at least one spring,
    wherein the hydraulic chamber for release is formed to have an outer diameter smaller than the hydraulic chamber for engagement, and
    wherein a biasing force receiving member configured to receive a biasing force of the at least one spring is coupled to the piston and is disposed at an outer circumferential side of the hydraulic chamber for release.

2. The automatic transmission of claim 1, wherein the at least one spring includes a first spring and a second spring with a longer free length than the first spring, the first spring configured to exert a larger biasing force than the second spring.

3. The automatic transmission of claim 1, wherein the hydraulic chamber for engagement and the hydraulic chamber for release are located radially inward of the at least one spring.

4. The automatic transmission of claim 1, wherein the hydraulic chamber for engagement completely axially overlaps with the at least one spring.

5. The automatic transmission of claim 1, wherein as viewed from an inner circumferential side toward an outer circumferential side of the automatic transmission, the plurality of friction plates overlap with the at least one spring.

6. An automatic transmission comprising a friction engaging element, the friction engaging element including:
    a plurality of friction plates disposed inside a transmission case;
    a piston configured to cause the plurality of friction plates to be engaged with each other;
    at least one spring configured to bias the piston in an engaging direction to cause the plurality of friction plates to be engaged with each other; and
    a hydraulic chamber for engagement to which hydraulic fluid to bias the piston in the engaging direction is supplied, and a hydraulic chamber for release disposed at an opposite side of the piston from the hydraulic chamber for engagement, the hydraulic chamber for release being supplied with hydraulic fluid to bias the piston in a releasing direction opposite from the engaging direction,
    wherein the hydraulic chamber for engagement and the hydraulic chamber for release are each disposed at a different radial position from the at least one spring but axially overlap with the at least one spring,
    wherein the hydraulic chamber for release is formed to have an outer diameter smaller than the hydraulic chamber for engagement,
    wherein a biasing force receiving member configured to receive a biasing force of the at least one spring is coupled to the piston and is disposed at an outer circumferential side of the hydraulic chamber for release, and
    wherein the at least one spring is disposed between both the hydraulic chamber for engagement and the hydraulic chamber for release and the transmission case, in a radial direction.

7. The automatic transmission of claim 6, wherein the hydraulic chamber for engagement and the hydraulic chamber for release are located radially inward of the at least one spring.

8. The automatic transmission of claim 6, wherein the hydraulic chamber for engagement completely axially overlaps with the at least one spring.

9. The automatic transmission of claim 6, wherein as viewed from an inner circumferential side toward an outer circumferential side of the automatic transmission, the plurality of friction plates overlap with the at least one spring.

10. The automatic transmission of claim 6, wherein the at least one spring includes a first spring and a second spring with a longer free length than the first spring, the first spring configured to exert a larger biasing force than the second spring.

* * * * *